US008451491B2

(12) United States Patent
Tanaka et al.

(10) Patent No.: US 8,451,491 B2
(45) Date of Patent: May 28, 2013

(54) APPARATUS FOR AND METHOD OF, FORMING PARENTHESIZED IMAGE; APPARATUS FOR AND METHOD OF, FORMING EXTERNALLY FRAMED IMAGE; PROGRAM; AND MEMORY MEDIUM

(75) Inventors: Seiji Tanaka, Nagano-ken (JP); Akinori Tsuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/335,739

(22) Filed: Dec. 22, 2011

(65) Prior Publication Data
US 2012/0327438 A1    Dec. 27, 2012

Related U.S. Application Data

(63) Continuation of application No. 12/961,423, filed on Dec. 6, 2010, now Pat. No. 8,102,562, which is a continuation of application No. 11/049,515, filed on Feb. 2, 2005, now Pat. No. 7,869,080.

(30) Foreign Application Priority Data

Mar. 2, 2004  (JP) .................................. 2004-57961
Mar. 2, 2004  (JP) .................................. 2004-57962

(51) Int. Cl.
*G06K 15/00*    (2006.01)
(52) U.S. Cl.
USPC ........... 358/1.18; 358/1.6; 358/1.9; 358/3.11; 358/3.12; 358/1.11
(58) Field of Classification Search
USPC ............... 358/1.6, 1.9, 3.11, 3.12, 1.11, 1.14, 358/1.15, 1.16, 1.17, 1.18
See application file for complete search history.

(56) References Cited

U.S. PATENT DOCUMENTS

| 5,680,520 A | 10/1997 | Watanabe et al. |
| 5,757,384 A | 5/1998 | Ikeda et al. |
| 5,778,161 A | 7/1998 | Watanabe et al. |
| 5,854,884 A | 12/1998 | Watanabe et al. |
| 5,926,618 A | 7/1999 | Watanabe et al. |
| 6,062,750 A | 5/2000 | Ueno et al. |
| 6,064,802 A | 5/2000 | Watanabe et al. |
| 2002/0089686 A1 | 7/2002 | Kitahara et al. ............. 358/1.14 |

FOREIGN PATENT DOCUMENTS

| JP | 59-230754 | 12/1984 |
| JP | 59-231590 | 12/1984 |
| JP | 63-136084 | 6/1988 |

(Continued)

OTHER PUBLICATIONS

Computer Graphics by Open GL.

*Primary Examiner* — Vu B Hang
(74) *Attorney, Agent, or Firm* — DLA Piper LLP (US)

(57) ABSTRACT

Outline font data showing the original outside shape having a single closed curve made up of a parenthesized outside shape portion of the parenthesized image and a connecting line portion to connect both open ends is stored. The height and line width are determined. Based on the above data, a first-size solidly shaded image is formed having the determined height and is entirely filled inside the original outside shape thereof with effective pixels of logic "1." A second-size solidly shaded image is formed of a second size which is smaller by the line width than the first-size solidly shaded image, along the parenthesized outside shape portion. Non-equivalence operation is performed with corresponding pixels by displacing the first-size solidly shaded image and the second-size solidly shaded image by the line width along the parenthesized outside shape portion.

7 Claims, 18 Drawing Sheets

FOREIGN PATENT DOCUMENTS

| | | |
|---|---|---|
| JP | 06-007309 | 1/1994 |
| JP | 06-236441 | 8/1994 |
| JP | 06-328791 | 11/1994 |
| JP | 08-063144 | 3/1996 |
| JP | 08-156334 | 6/1996 |
| JP | 09-234848 | 9/1997 |
| JP | 09-300703 | 11/1997 |
| JP | 2000-259845 | 9/2000 |

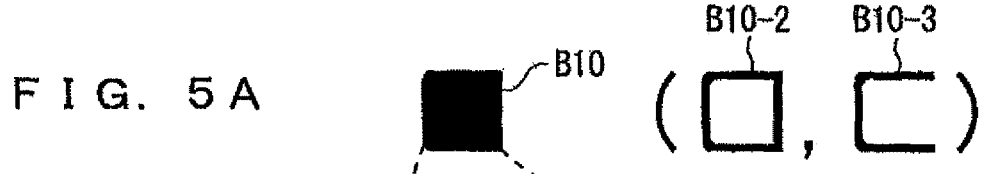
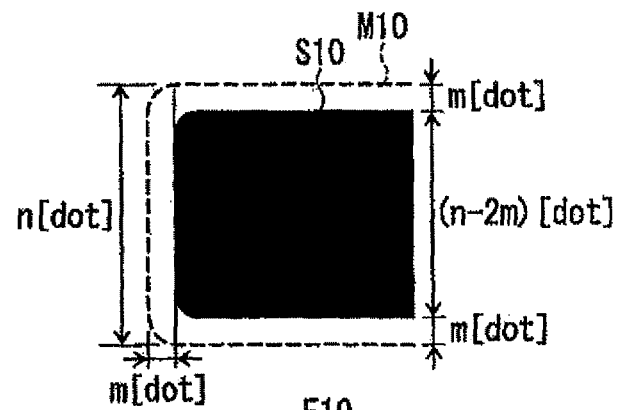
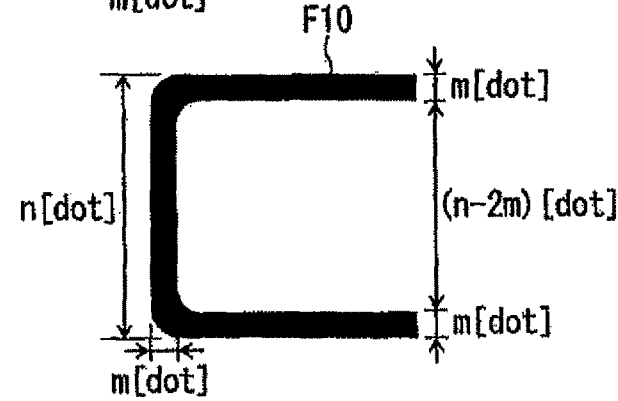
FIG. 5A
FIG. 5B
FIG. 5C
FIG. 5D

FIG. 7A
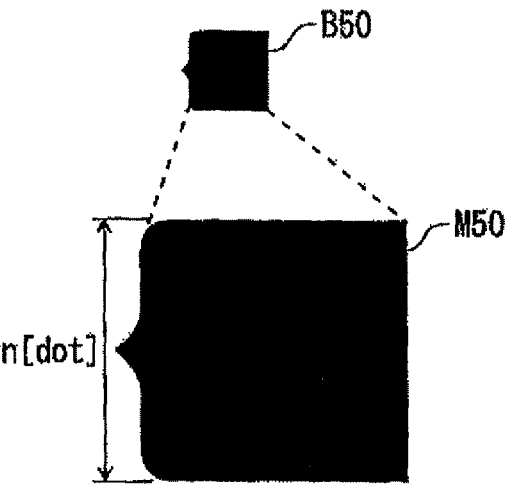
FIG. 7B
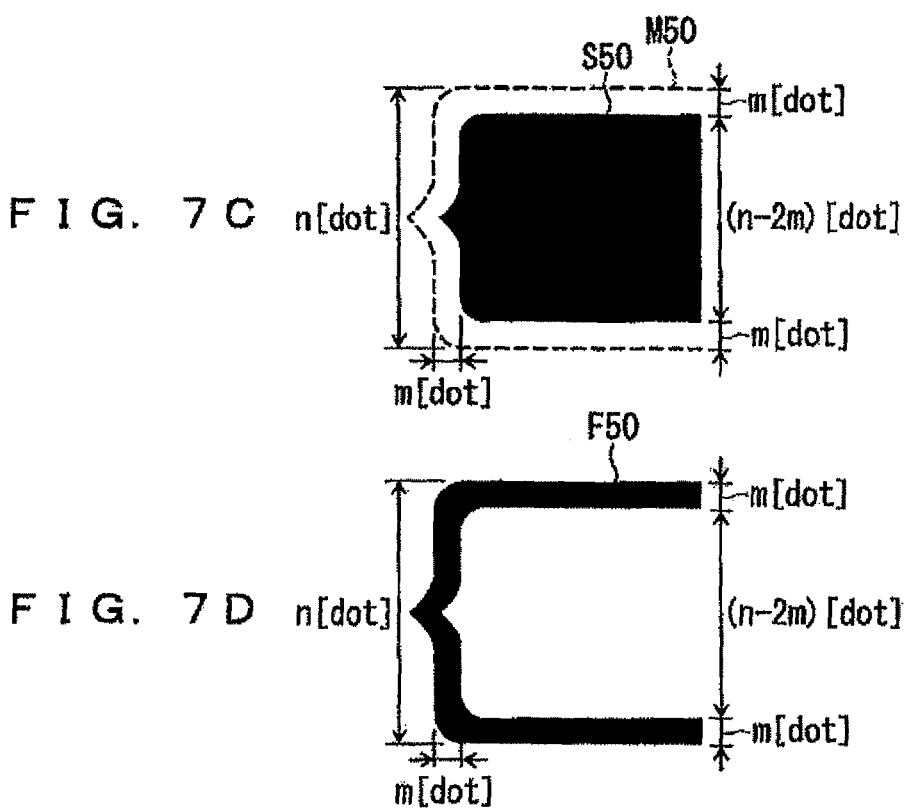
FIG. 7C
FIG. 7D

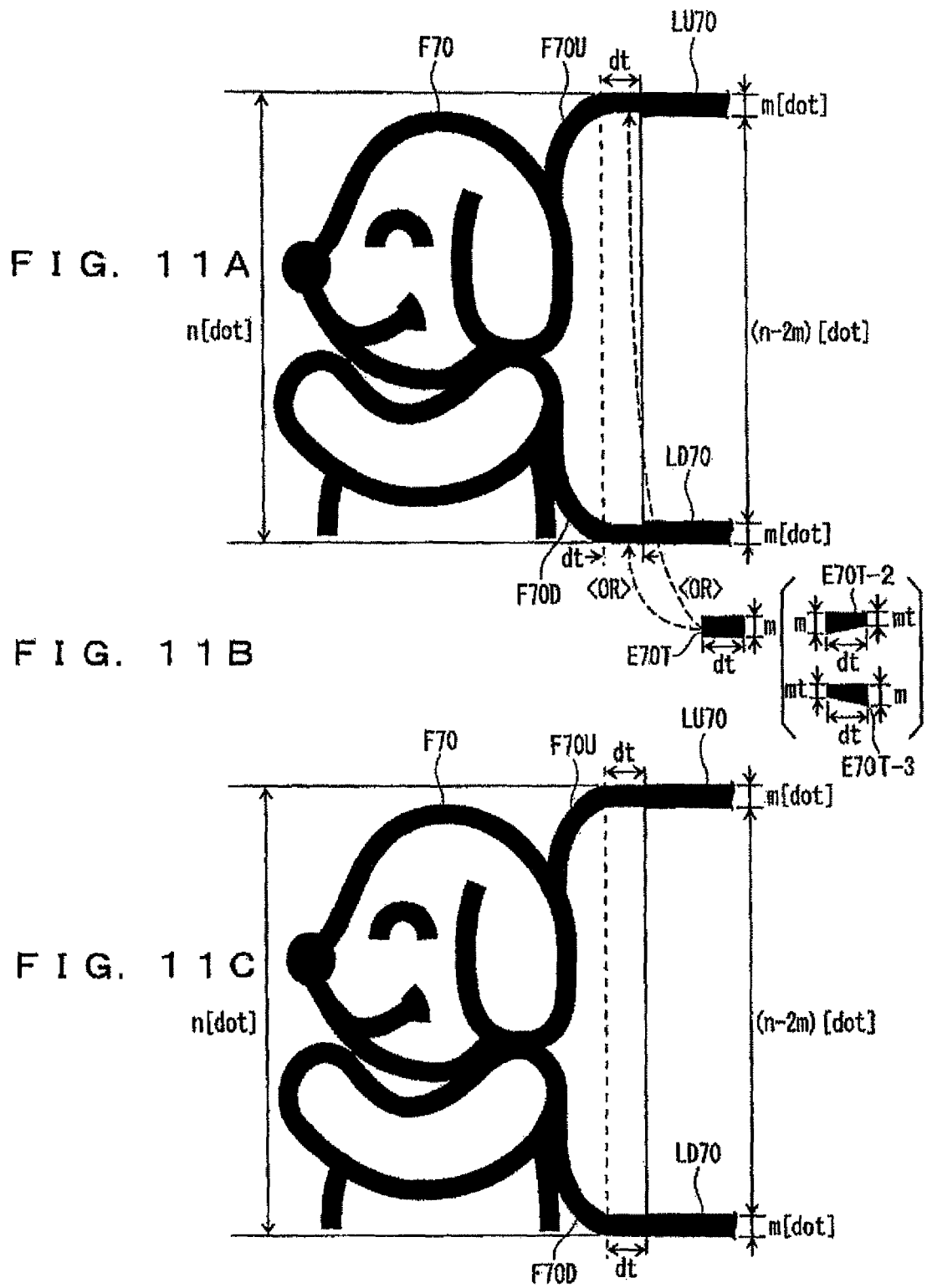

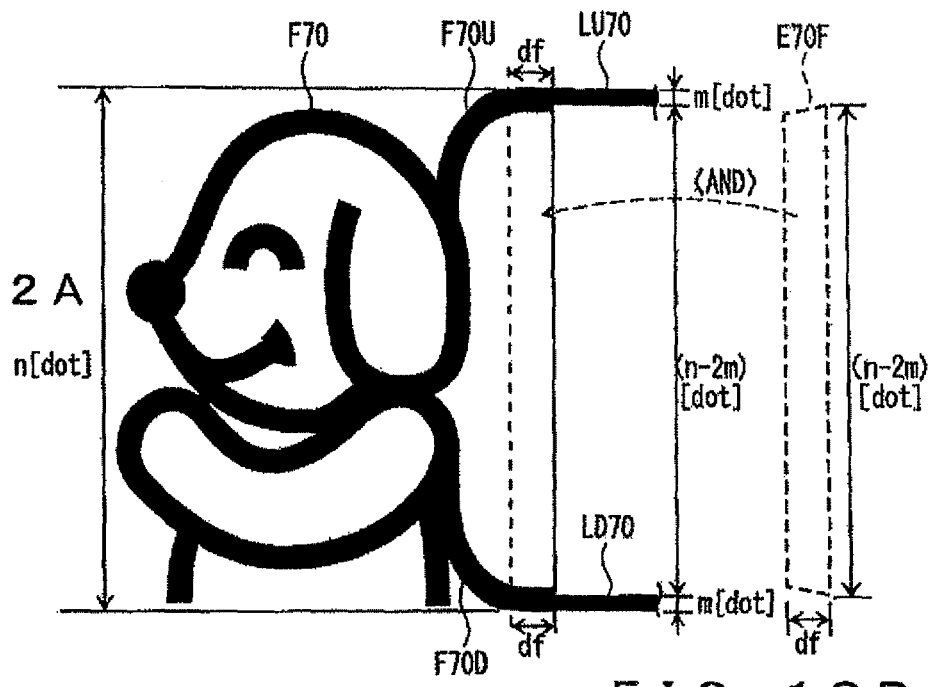
FIG. 12A
FIG. 12B
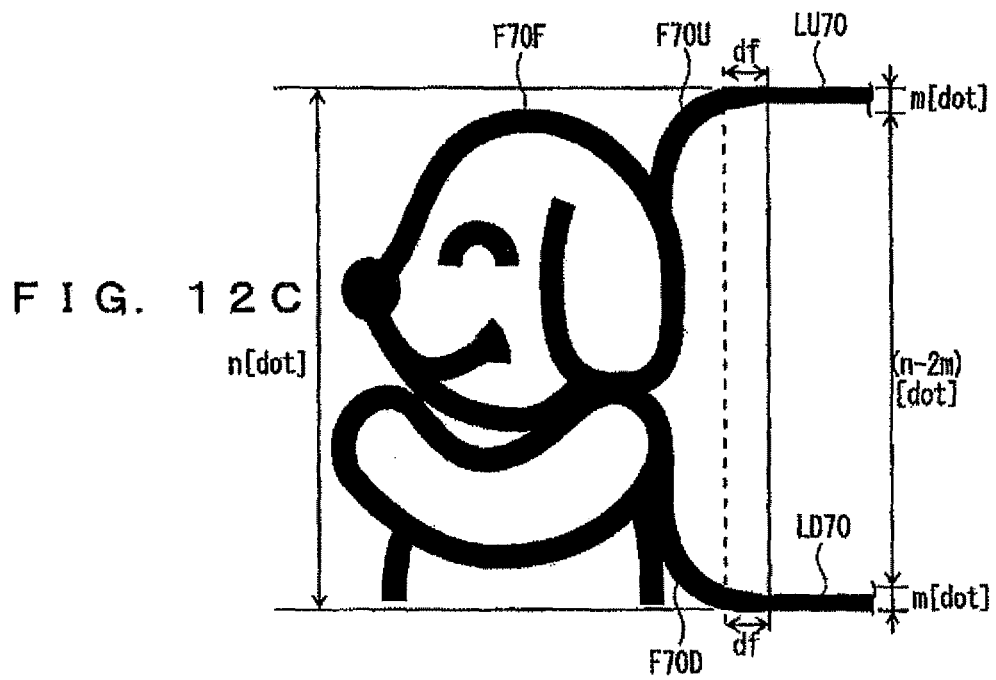
FIG. 12C

FIG. 15A
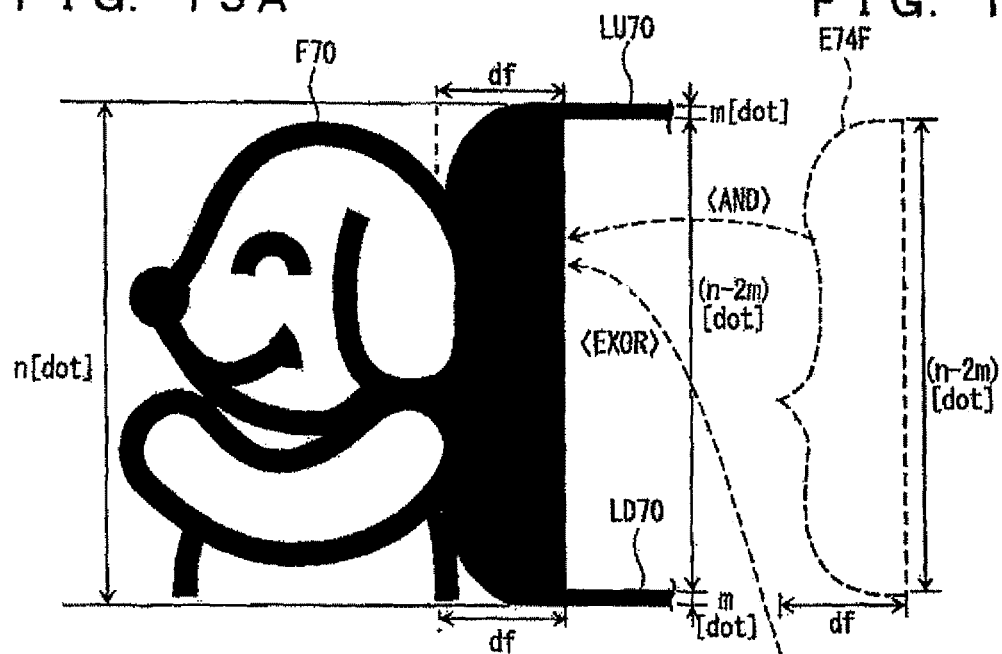
FIG. 15B
FIG. 15D
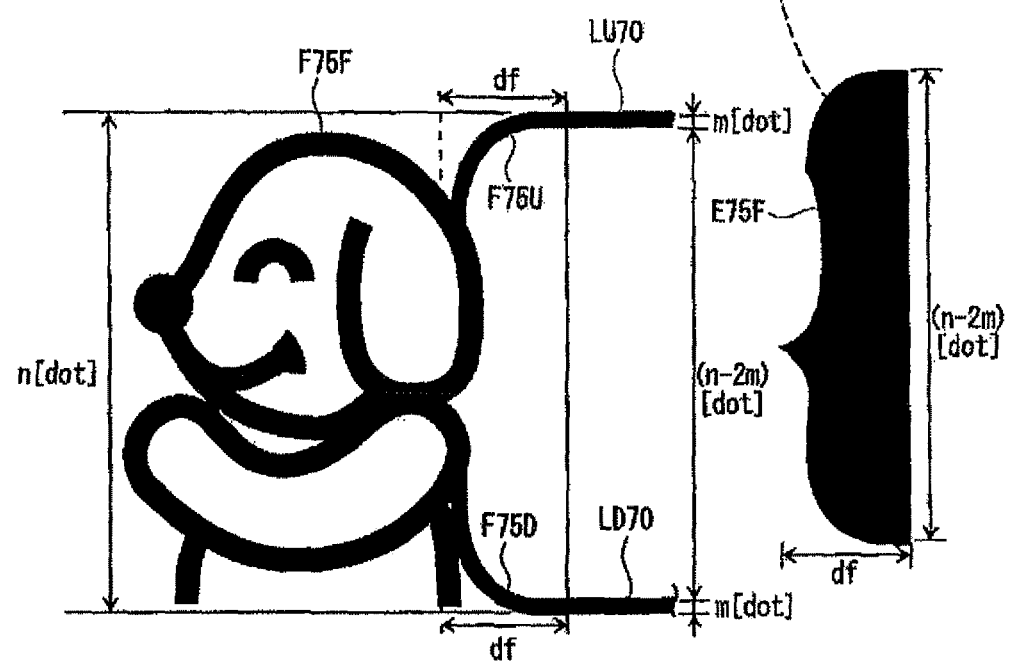
FIG. 15C

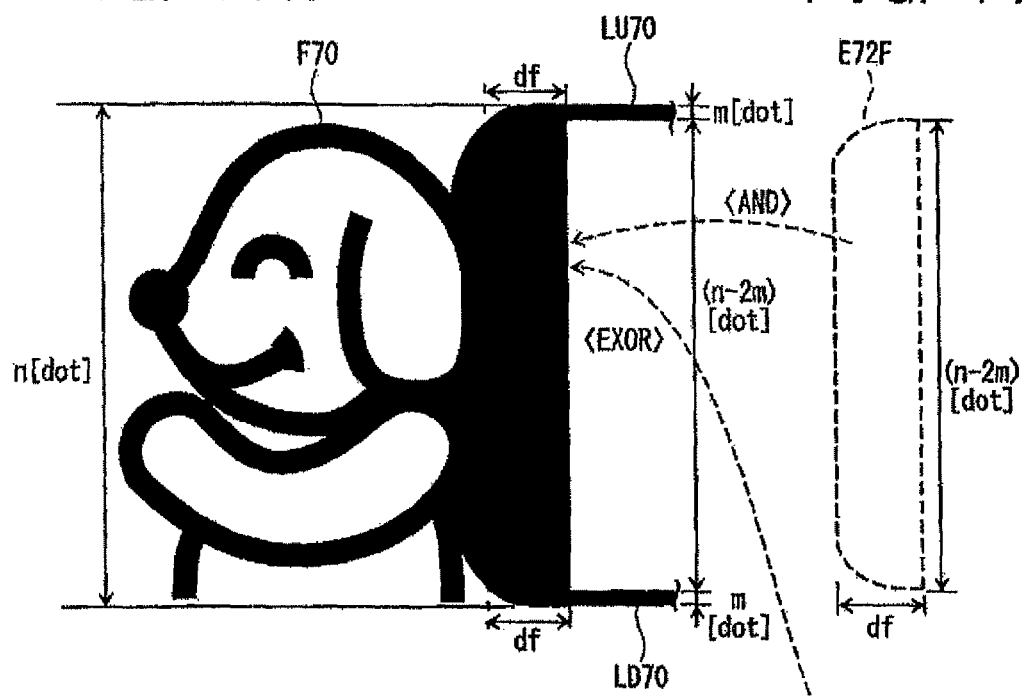
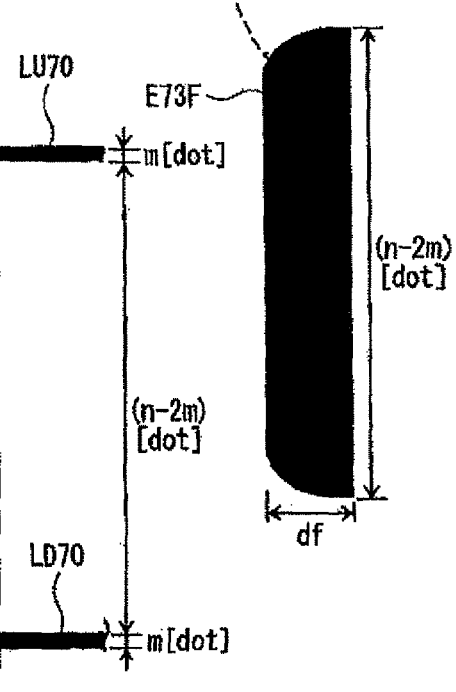
FIG. 17A
FIG. 17B
FIG. 17C
FIG. 17D

APPARATUS FOR AND METHOD OF, FORMING PARENTHESIZED IMAGE; APPARATUS FOR AND METHOD OF, FORMING EXTERNALLY FRAMED IMAGE; PROGRAM; AND MEMORY MEDIUM

CROSS-REFERENCE TO THE RELATED APPLICATIONS

This application is a continuation of application Ser. No. 12/961,423, filed on Dec. 6, 2010, which is a continuation of application Ser. No. 11/049,515, filed on Feb. 2, 2005, and claims the benefit of priority under 35 USC 119 to Japanese Patent Application Nos. 2004-057961 and 2004-057962, both filed on Mar. 2, 2004, all of which are incorporated herein by reference in their entirety.

BACKGROUND OF THE INVENTION

1. Field of the Invention

This invention relates to: an apparatus for forming a parenthesized image which is used as a part of an externally framed image (i.e., an, image enclosed by an outside frame); a method of forming a parenthesized image; an apparatus for forming an externally framed image which is made up of a front decorative-figure image (e.g., a fancy image of, e.g., an animal, a human being, a toy, or the like), a rear decorative-figure image, and upper and lower ruled lines to connect them together; a method of forming an externally framed image; a program; and a memory medium.

2. Description of the Related Art

As a method of preparing a stamp image, or the like, there is known the following. Namely, in one method, images in the form of a pair of front and rear parentheses (also called parenthesized images) are disposed in advance, and these two images are connected together by ruled lines, thereby obtaining an image with an outer frame. In another method, a pair of decorative-figure images (i.e., a front decorative-figure image and a rear decorative-figure image) each having a parenthesis attached thereto are disposed in advance, and these two images are connected together by ruled lines, thereby obtaining an externally framed image.

In case this kind of externally framed image is prepared in various sizes depending on the necessity, the longitudinal size can be adjusted by varying the length of the ruled lines. The widthwise size, on the other hand, is determined by the widthwise size (hereinafter also called "height") of the parenthesized image, i.e., determined by the size between the upper edge and the lower edge of the parenthesis. It follows that various kinds of parenthesized images must be prepared and disposed in advance. In such a case, if the parenthesized image must be prepared in bitmap font data for each of the various kinds of heights, a vast amount of storage capacity will be required. In addition, if the parenthesized image is prepared by enlarging or reducing the size based on the bit-map fonts, the curved portions, if any, of the parenthesis cannot be made smooth enough, resulting in a poor aesthetic impression of the image.

In case an image is formed by outline font, a parenthesized image of a relatively free height having a good aesthetic impression can be prepared by image development. However, the ratio of enlargement in image development applies not only to the "height" of the parenthesis, but also to the "line width." Therefore, if the height is arbitrarily determined, the line width is also determined. The result will be no longer arbitrary in that the line width cannot be arbitrarily selected. It has thus so far been difficult to arbitrarily set both the height and width. In some cases, depending on the ratio of enlargement, the line width after enlargement does not fit the predetermined width of the ruled line. This brings about a problem in that the point of connection between the ruled line and the enlarged line (also called the connecting point) does not meet smoothly (i.e., a step is formed therein).

As shown in FIGS. 9A-9C and 10A-10C, a front decorative-figure image and a rear decorative-figure image for making the above-described externally framed image are accompanied with a design (or a pattern) for decoration purpose. In case an externally framed image is made using the above, the longitudinal size thereof can be adjusted by varying the length of the ruled lines. The widthwise size thereof, however, is that size in the height direction of the decorative-figure image which forms the width of the external frame. In concrete, the widthwise size thereof is determined by the size between an upper edge of an upper extension line F60U-F80U (or R60U-R80U) and a lower edge of a lower extension line (e.g., n [dot] in FIG. 11A; hereinafter also referred to as "height"). Therefore, various heights of decorative-figure images must be prepared in advance.

In such a case, a large amount of memory capacity is required if the decorative-figure images are prepared in bit map font for various kinds of heights. If the decorative-figure images are prepared by enlarging and/or reducing based on the bit map font, the curved portions cannot be made smoothly, resulting in an aesthetically poor impression.

In this respect, with outline font, a decorative-figure images of relatively free height can be prepared in good aesthetic impression by image development. However, the ratio of image development applies not only to the "height" but also to the "line width." If an arbitrary height is selected, the line width will also be determined and will no longer be arbitrary. It follows that the extension line cannot be made into an arbitrary line width. In addition, depending on the ratio of enlargement, due to a rounding error, or the like, the line width of the upper extension line F60U, or the like, and the line width of the lower extension line F60D, or the like, both of which form the connecting point to the ruled line, varies by the unit of one dot (i.e., varies by one dot depending on the rounding error). There is thus a problem in that the width of the extension line after enlargement does not agree with the width of a given ruled line, with the result that the connection to the ruled line does not form a smooth line (i.e., forms a step).

SUMMARY OF THE INVENTION

This invention has an advantage of providing: an apparatus for forming a parenthesized image in which a parenthesized image of an arbitrary height and arbitrary line width can be easily formed in an aesthetically superior manner (or in a good-looking manner) based on outline font; and a method of forming a parenthesized image. It has also an advantage of providing: an apparatus for forming an externally framed image in which an externally frame image of an arbitrary height and an arbitrary line width can be formed in a good-looking manner by smoothing the connecting point between the extension lines and the ruled lines for the front decorative-figure image and the rear decorative-figure image; a method of forming an externally framed image; a program; and a memory medium.

According to one aspect of this invention, there is provided an apparatus for forming a parenthesized image in which a parenthesized image constituting one of a front and rear pair of images of an arbitrary height and arbitrary line width is formed based on outline font. The apparatus comprises:

means for storing outline font data as original outside shape data, the original outside shape having a single closed curve made up of a parenthesized outside shape portion of the parenthesized image and a connecting line portion to connect both open ends thereof; means for determining the height and line width of the parenthesized image; means for forming, based on the outside shape data, a first-size solidly shaded image which has the determined height and is entirely filled inside the original outside shape thereof with effective pixels of logic "1"; means for forming, based on the outside shape data, a second-size solidly shaded image of a second size which is smaller by the line width than the first-size solidly shaded image, along the parenthesized outside shape portion; and means for performing non-equivalence operation with corresponding pixels by displacing the first-size solidly shaded image and the second-size solidly shaded image by the line width along the parenthesized outside shape portion.

According to another aspect of this invention, there is provided a method of forming a parenthesized image in which a parenthesized image constituting one of a front and rear pair of images of an arbitrary height and arbitrary line width is formed based on outline font. The method comprises: storing data, as original outside shape data, of outline font data having a single closed curve made up of a parenthesized outside shape portion of the parenthesized image and a connecting line portion to connect both open ends thereof; determining the height and line width of the parenthesized image; forming, based on the outside shape data, a first-size solidly shaded image which has the determined height and is entirely filled inside the original outside shape thereof with effective pixels of logic "1"; forming, based on the outside, shape data, a second-size solidly shaded image of a second size which is smaller by the line width than the first-size solidly shaded image, along the parenthesized outside shape portion; and performing non-equivalence operation with corresponding pixels by displacing the first-size solidly shaded image and the second-size solidly shaded image by the line width along the parenthesized outside shape portion.

According to this apparatus and method, one of a parenthesized image which constitutes the front and rear pair of parenthesized images is formed based on the outline font in an arbitrary height and an arbitrary line width. In concrete, outline font data showing the original outside shape having a single closed curve made up of a parenthesized outside shape portion of the parenthesized image and a connecting line portion to connect both open ends is stored as the original outside shape data. As the original outside in this case, there need be only the outline of the outside shape (at least only the parenthesized outside shape). As described hereinafter, however, since there is formed an image the inside of which is wholly filled with effective pixels of logic "1," preferably, an indication shall be made to that effect (i.e., to the effect that the inside is filled with effective pixels).

Then, a first-size solidly shaded image having the determined height and the outside shape thereof is wholly filled with effective pixels is formed by image development based on the original outside shape data. In this case, since the original outside shape data is outline font data, the curved portion, or the like, can also be smoothly formed in a good-looking manner in an aesthetically superior manner) even if the height (i.e., the size in the open width direction of the parenthesis) is freely determined. On the other hand, in case only the outline of the outside shape is drawn, the line width of the ruled line is also determined by the ratio of enlargement when the above-described height is determined. However, since the inside thereof is wholly filled with effective pixels, the line width of the outline does not matter at all. Further, in a similar manner, there is formed, along the parenthesized outside shape portion, a second-size solidly shaded image of a second size which is smaller by the line width than the first-size solidly filled image. In this case, too, since it is based on outline font, the curved portion is also formed in a good-looking manner. In addition, since the inside is wholly filled in, there occurs, no problem in the line width of the outline.

Now, when non-equivalence operation with corresponding pixels is performed by displacing the first-size solidly shaded image and the second-size solidly shaded image by the line width along the parenthesized outside shape portion, there remains only the size differential of both the images, i.e., only the amount equivalent to the line width remains along the parenthesized outside shape. In other words, there remains only the parenthesized outside shape of the designated height and the designated line width, thereby obtaining a desired parenthesized image. According to the above-described arrangement, by designating the height and line width, there can be obtained a parenthesized image of an arbitrary height and line width based on outline font in a good-looking manner even if the parenthesized image partially includes curved portions such as arcs.

In the above-described apparatus, preferably, the outside shape original data has information that the original outside shape is entirely filled inside thereof with the effective pixels.

According to this arrangement, the outside shape original data shows that not only the original outside shape (outline) but also the inside of the outside shape are entirely filled with, effective pixels. Therefore, when the first-size solidly shaded image and the second-size solidly shaded image are formed, the image whose inside is completely filled or solidly shaded can be easily formed only by image development based on the outline shape data without newly preparing (or adding by insertion) the processing of filling the inside depending on the scanning of the outside shape (outline).

According to another aspect of this invention, there is provided an apparatus for forming an externally framed image in which an externally framed image is formed by connecting, with an upper ruled line and a lower ruled line, an upper extension line and a lower extension line of a front decorative-figure image constituting a front end portion of an external frame to an upper extension line and a lower extension line of a rear decorative-figure image constituting a rear end portion of the external frame, respectively. The apparatus comprises: first means for steplessly adjusting an outside contour and inside contour between adjustment (or adjusting) extension line and adjustment (or adjusting) ruled line which constitute an adjustment connecting point which is made up of at least one of a connecting point between the upper extension line of the front decorative-figure image and the upper ruled line, a connecting point between the lower extension line of the front decorative-figure image and the lower ruled line, a connecting point between the upper extension line of the rear decorative-figure image and the upper ruled line, and a connecting point between the lower extension line of the rear decorative-figure image and the lower ruled line, wherein said first means comprises: second means for setting image adjustment region inclusive of the adjustment connecting point, an end portion of the adjustment extension line, and an end portion of the adjustment ruled line relative to the externally framed image before adjustment; third means for defining crossing points by obtaining an upper crossing point and a lower crossing point between that end of the image adjustment region which lies an the side of the adjustment extension line and an outside contour and inner contour of the adjustment extension line, respectively, and also for obtaining an upper crossing point and a lower crossing point between that end of the image adjustment region which lies on the side of the adjustment ruled line and an outside contour, and an inner contour of the adjustment ruled line, respectively; and fourth means for disposing, in place of the image of the externally framed image before adjustment inside the image adjustment region, a connection image having an upper contour steplessly connecting the extension-line-side upper crossing point and the ruled-line-side upper crossing point, and also having a lower contour steplessly connecting the extension-line-side lower crossing point and the ruled-line-side lower crossing point.

According to yet another aspect of this invention, there is provided a method of an externally framed image in which an externally framed image is formed by connecting, with an upper ruled line and a lower ruled line, an upper extension line and a lower extension line of a front decorative-figure image constituting a front end portion of an external frame to an upper extension line and a lower extension line of a rear decorative-figure image constituting a rear end portion of the external frame, respectively. The method comprises: steplessly adjusting an outside contour and inside contour between adjustment connection line and adjustment ruled line which constitute an adjustment connecting point which is made up of at least one of a connecting point between the upper extension line of the front decorative-figure image and the upper ruled line, a connecting point between the lower extension line of the front decorative-figure image and the lower ruled line, a connecting point between the upper extension line of the rear decorative-figure image and the upper ruled line, and a connecting point between the lower extension line of the rear decorative-figure image and the lower ruled line.

According to this apparatus for, and method of, forming an externally framed image, an externally framed image is formed by connecting an upper extension line and a lower extension line of a front decorative-figure image constituting a front end portion of an external frame to an upper extension line and a lower extension line of a rear decorative-figure image constituting a rear end portion of the external frame, respectively. At this time, stepless adjustment to do away with the steps is made between the adjustment connection line and the adjustment ruled line, with at least one of the connecting points between the extension lines and the ruled lines of the decorative-figure image serving as a connecting point for adjustment. As a result, the outline of the connecting point can be made smooth. In other words, when the front and rear decorative-figure images are disposed, they are disposed at an arbitrary height regardless of the line width. When the ruled line is disposed, it is disposed by making only the outside edge (outside of the external frame) flush with each other by slightly disregarding the smoothness at the connecting point. The externally parenthesized image before adjustment is thus once formed in this manner. Then, the smoothness of the connecting point can be adjusted. Accordingly, the externally framed image of an arbitrary height and arbitrary line width can be formed in a good-looking manner. In addition, according to the apparatus, setting is made of an image adjustment region inclusive of the adjustment connecting point, an end portion of the adjustment extension line, and an end portion of the adjustment ruled line relative to the externally framed image before adjustment. There are obtained an upper crossing point and a lower crossing point between that end of the image adjustment region which lies on the side of the adjustment extension line and an outside contour and inner contour of the adjustment extension line, respectively, and also an upper crossing point and a lower crossing point between that end of the image adjustment region which lies on the side of the adjustment ruled line and an outside contour and an inner contour of the adjustment ruled line, respectively. And, in place of the image of the externally framed image before adjustment inside the image adjustment region, there is disposed a connection image having an upper contour steplessly connecting the extension-line-side upper crossing point and the ruled-line-side upper crossing point, and also having a lower contour steplessly connecting the extension-line-side lower crossing point and the ruled-line-side lower crossing point. Therefore, the contour of the connecting point for adjustment can be adjusted. As a result, by connecting this line by a straight line or a smooth curved line in a stepless manner, the contour between the adjustment connection line and the adjustment ruled line which constitute the connecting point for adjustment can be formed in a stepless manner.

According to another aspect of this invention, there is provided a program capable of functioning each means of the above-described apparatus for forming parenthesized image or the above-described apparatus for forming externally framed image, or capable of performing the method of forming parenthesized image or the method forming an externally framed image.

As a result of being processed by a programmable apparatus, this program can form a parenthesized image of an arbitrary height and an arbitrary line width in a good-looking manner based on outline font. Or else, an externally framed image of an arbitrary height and an arbitrary line width can be formed in a good-looking manner while smoothing the connecting point between the extension line and the ruled line of the front and rear decorative-figure images.

According to still another aspect of this invention, there is provided a memory medium for storing the above-described program in manner to be readable by a programmable apparatus.

By reading out the program stored in the memory medium in a programmable apparatus, a parenthesized image of an arbitrary height and arbitrary line width can be formed based on outline font in a good-looking mariner. In addition, by smoothing the connecting point between the extension lines of the front and rear decorative-figure images, an externally framed image of an arbitrary height and an arbitrary line width can be formed in a good-looking manner.

BRIEF DESCRIPTION OF THE DRAWINGS

The above and other objects and the attendant features of this invention will become readily apparent by reference to the following detailed description when considered in conjunction with the accompanying drawings wherein:

FIGS. 5A-5D are explanation views showing one example of method of forming a parenthesized image;

FIGS. 7A-7D are explanation views, similar to those of FIGS. 5A-5D, showing still another example;

FIGS. 11A-11C are explanation views showing a contour adjustment image and one example of contour adjustment thereby;

FIGS. 12A-12C are explanation views, similar to those in FIGS. 11A-11C, showing another example;

FIGS. 15A-15D are explanation views, similar to those in FIGS. 11A-11C, showing still another example;

FIGS. 17A-17D are explanation views, similar to those in FIGS. 11A-11C, showing still another example.

DETAILED DESCRIPTION OF THE PREFERRED EMBODIMENTS

Detailed description will now be made about a tape printing apparatus according to one embodiment (first embodiment) of this invention with reference to the accompanying drawings.

Figure 1:
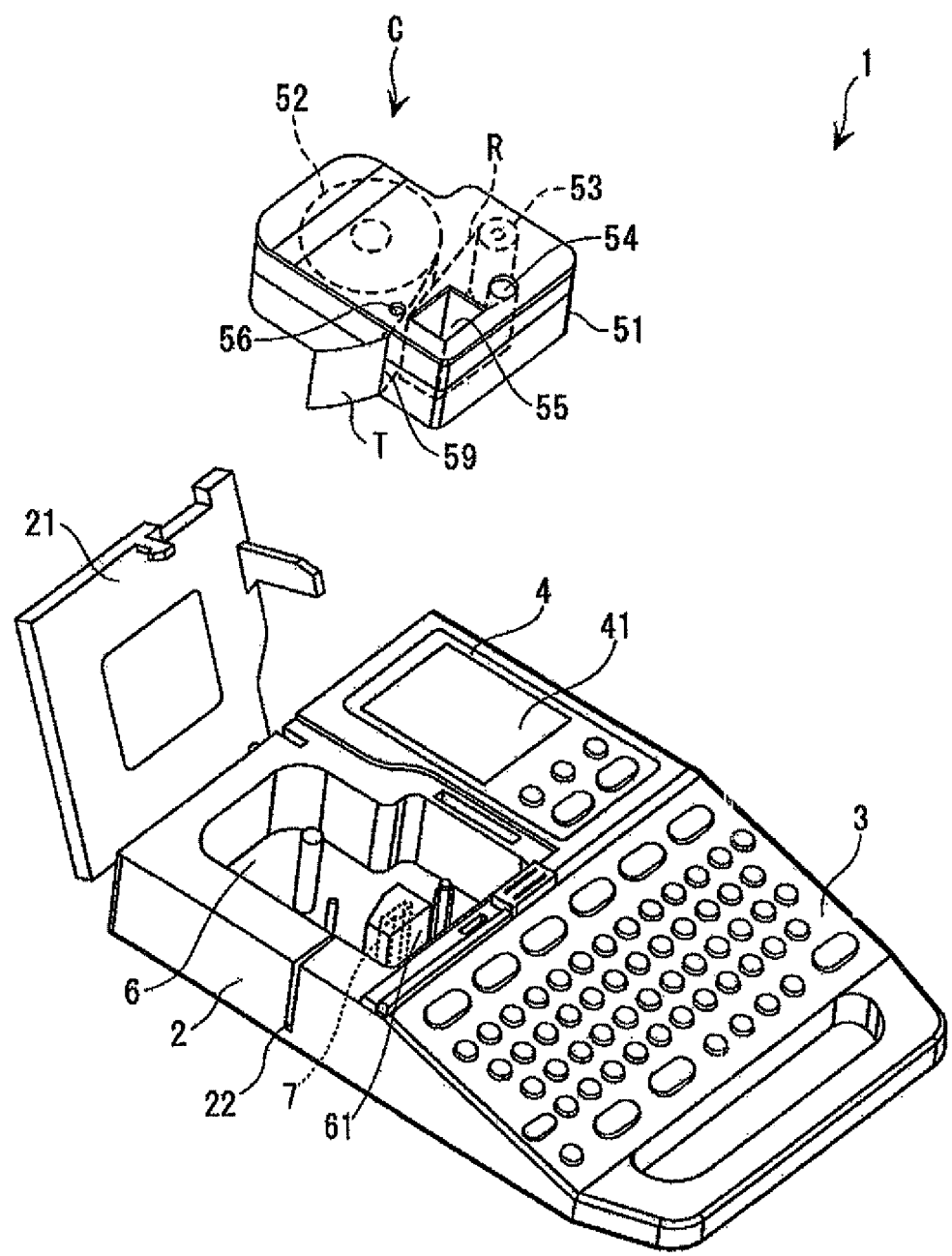
FIG. 1 is an outside perspective view of a tape printing apparatus according to this invention in a state in which a lid thereof is left open.
Figure 2:
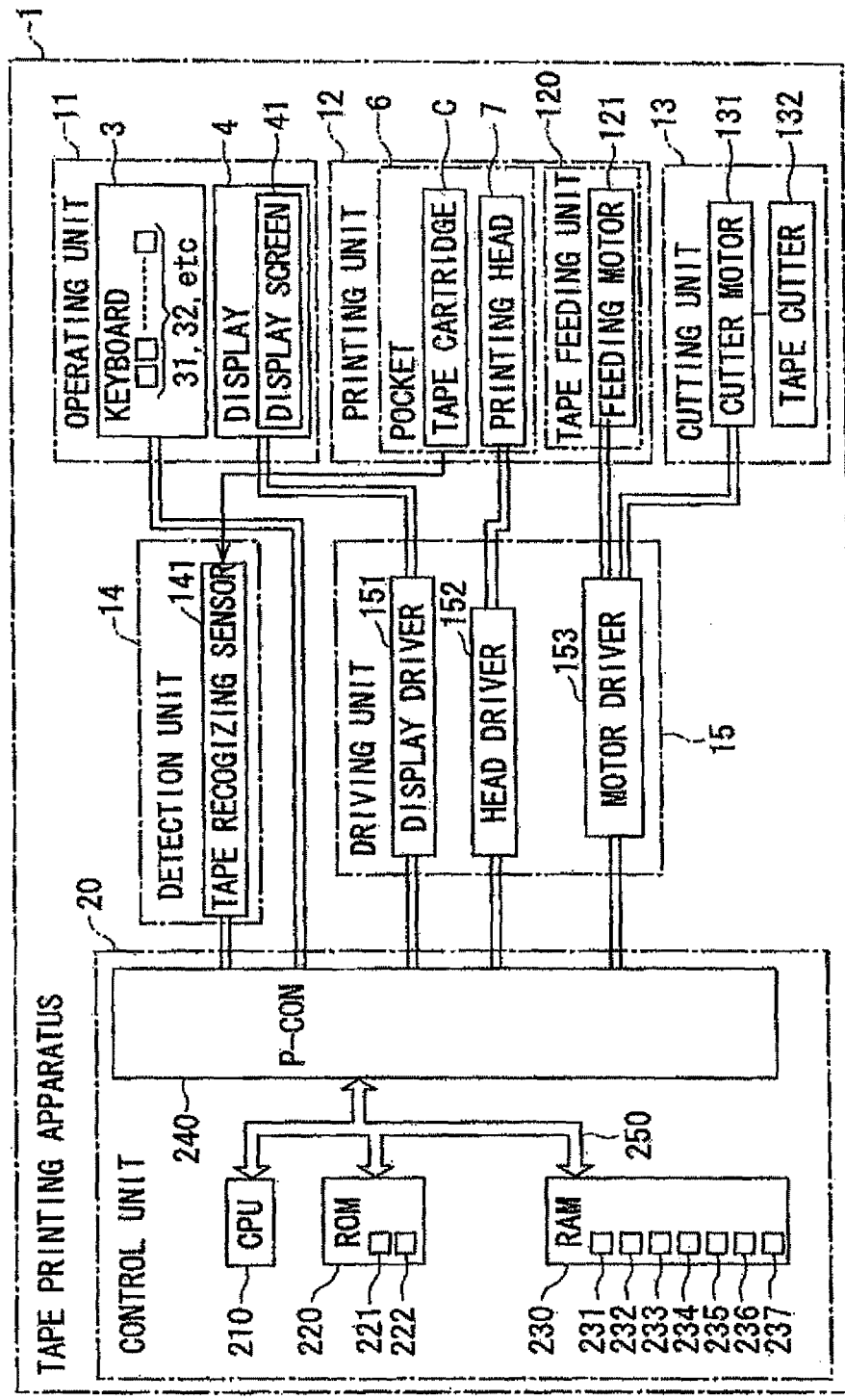
FIG. 2 is a schematic block diagram showing the control system of the tape printing apparatus in FIG. 1.

As shown in FIGS. 1 and 2, the tape printing apparatus 1 has an outer shell which is made up of an apparatus casing (apparatus man body) 2. In, a front upper face of the apparatus casing 2, there is provided a keyboard 3 which is made up of various input keys. On a rear upper face thereof, there are disposed an open-close lid 21 on the left side and a display 4 on the right side thereof. On the left aide of the apparatus casing 2 there is formed a slit-like tape discharge outlet 22 which is in communication with a pocket (tape mounting portion) 6 and an outside of the apparatus. A tape cutter 132 for cutting a fed-out printing tape (hereinafter simply referred to as a tape) is provided in a manner to face the tape discharge outlet 22.

As a basic construction from the viewpoint of control system, there are provided: an operating unit 11 having the keyboard 3 and the display 4 and performing interface with a user; a printing unit 12 having a printing head (thermal head) 7 and a tape feeding unit 120 and for performing printing on the tape T in a tape cartridge C mounted (or loaded) into the pocket 6; a cutting unit 13 for cutting the printed tape T; a detection unit 14 having various sensors and for performing various detections; a driving unit 15 having various drivers and for driving various circuits; and control unit 20 for controlling various parts inside the tape printing apparatus 1. Therefore, the apparatus casing 2 contains therein circuit board (not illustrated) aside from the printing unit 12, the cutting unit 13 and the detection unit 14. This circuit board has mounted thereon, aside from an electric power unit, circuits for the driving unit 15 and the control unit 20, and is connected from an AC adaptor connector to a battery (not illustrated) such as a Nicad battery which is detachably mounted thereon.

After having mounted a tape cartridge C into the pocket 6, the user operates the tape printing apparatus 1 to input through the keyboard 3 printing information such as desired letters or the like (letters, numerals, symbols, simplified decorative-figures, or the like). When a command is given to perform printing, the tape T is fed out of the tape cartridge C by the tape feeding unit 120 to thereby perform desired printing on the tape T by means of the printing head 7. The printed portion of the tape T is discharged, as required, out of the tape printing apparatus 1 through the tape discharge outlet 22. When the desired printing has been finished, the tape feeding unit 120 feeds the tape T to a longitudinal position of the tape inclusive of an extra margin (or space) and then stops the feeding operation.

Inside the open-close lid 21 of the printing unit 12, there is provided the pocket 6 for mounting therein the tape cartridge C, which is detachably mounted therein or therefrom with the open-close lid 21 left open. On a rear side of the tape cartridge C, there are, provided a plurality of small holes (not illustrated) for recognizing or distinguishing the kind of the tape T whose tape width, or the like, is different from one another. A tape recognizing sensor 141 such as a micro-switch is disposed in the pocket 6 to detect the presence or absence of the holes. It is thus possible to detect the presence or absence (accurately, whether the tape cartridge C is mounted or not) and the kind of the tape T (accurately, the kind of the tape cartridge C).

The tape cartridge C contains therein the tape T and an ink ribbon R of a given width (about 4.5 mm-48 mm), and has formed therein a through opening 55 so as to face the printing head 7. The tape T has a construction in which an adhesive layer is formed on the rear surface thereof and in which the adhesive layer is covered by a piece of release paper (peel-off paper). In a portion in which the tape T and the ribbon R are overlapped with each other, there is contained a platen roller (platen) 56 in a manner to correspond to the printing head 7 which is housed in the head unit 61. In a state in which the tape cartridge C is mounted, the printing head 7 comes into contact with the rear surface of the ink ribbon R which is exposed out of the through opening 55 so that, due to heat-generating drive, the desired letters, or the like, are printed on the front surface of the tape T.

The tape feeding unit 120 is disposed in a space extending from the side area to the downward area of the pocket 6 and has a feeding motor 121 as the power (driving) source. When the tape cartridge C is mounted into the pocket 6 and the open-close lid 21 is closed in that state, the tape T is fed out of the tape reel 52 by the feeding motor 121 serving as the driving source, and the ink ribbon R is fed out of the ribbon feeding reel 53. The printing head 7 sandwiches the tape T and the ink ribbon R at a position of the through opening 55 and comes into contact with the platen 56. The tape T and the ink ribbon R travel in a state of overlapping with each other, and the printing head 7 is driven in a synchronized manner. Thereafter, the ink ribbon R is taken up into the take-up reel 54 and only the tape T is discharged out of the tape cartridge C through the slit 59. The platen 56 keeps on rotating (the ribbon take-up reel 54 also keeps on rotating) for a predetermined period of time. As a result, the feeding of the tape T is continued and the tape T is fed outside the apparatus through the tape discharge outlet 22 until the predetermined cutting position of the tape T is fed to the tape cutter 132.

The cutting unit 13 is made up of the tape cutter 132 and a cutter motor 131 for operating the tape cutter 132. The mode of operation can be switched between automatic operation and manual operation by mode setting. The cutter motor 131 is operated in the manual mode in case the tape T is printed in an arbitrary length and in the automatic mode in case the tape T is printed in a predetermined set length. The detection unit 14 has the above-described tape recognition sensor 141 and also various kinds of sensors inside the apparatus. The driving unit 15 is made up of a display driver 151 and a motor driver 153. The display driver 151 drives the display 4 of the operating unit 11 depending on the command based on a control signal to be outputted by the control unit 20. Similarly, the head driver 152 drives the printing head 7 of the printing unit 12. The motor driver 153 drives each of the motors such as the feeding motor 121 of the printing unit 12, the cutter motor 131 of the cutting unit 13, or the like.

The operating unit 11 has the keyboard 3 and the display 4. The display 4 is made up of: a display screen 41 which is capable of displaying the display image data of 96 dots×128 dots within a rectangle of about 6 cm in the lateral direction (X direction)×12 can in the longitudinal direction (Y direction) and 18 indicators for displaying each of the setting conditions, or the like. The display 4 is used when the user inputs data through the keyboard 3 to thereby prepare and edit printing image data such as character string image data, or the like, or when the result of inputting is recognized, or when various commands/selection commands are inputted.

The keyboard 3 has disposed therein letter key group 31 inclusive of alphabetical key group, numeral key group, Japanese "kana" group such as "hirakana" and "katakana," and user-defined character key group for calling up and selecting user-defined characters; and function key group 32 for designating various operation modes, or the like.

The function key group 32 includes power switch key; printing key for commanding printing operation; selection key for selection commands of various modes in data entry at the time of text inputting, carriage return, or the like; cancellation key for deleting various operations; deleting key for stopping various processing or deleting characters or the like after entry; form key for setting printing style and other various styles; cutting key for the above-described manual cutting; and 4 cursor keys for moving the cursor or the display area on the display screen 41 to up, down, right and left directions. Separate keys may be provided for each of the key inputting or fewer keys may be used for inputting in combination with shift key, or the like. The keyboard 3 inputs various commands and data into the control unit 20 through these various keys.

The control unit 20 is provided with a CPU 210, a ROM 220, a RAM 230 and a peripheral control circuit 240 (P-CON), which are connected together by means of an internal bus 250. The ROM 220 has: a control program area 221 for storing therein the control programs to be processed in the CPU 210; and a control data area 222 for storing therein font data, color conversion table, letter decoration table, or the like, for the letters, or the like (numerals, symbols, graphics, or the like) which are prepared inside the apparatus. The RAM 230 is backed up for power failure and has: various flag register group 231; text data area 232; display image data area 233; printing image data area 234; graphics-drawing registration data area 235; user-defined character registration image area 236; various buffer area 237 such as letter development buffer, printing buffer, or the like. The RAM is used as working for various processing.

The P-CON 240 has assembled therein: logic circuit for supplementing the function of the CPU 210 and for handling the interface signals with peripheral circuits; and function circuit such as a timer for performing various time counting, or the like, the circuits being constituted by gate array, custom LSI, or the like. The P-CON 240 is therefore connected to the various sensors and the keyboard 3 and the various detection signals, various commands, and input data are captured into the internal bus 250 as they are or with due modification. In interlocking with the CPU 210, the P-CON 240 outputs the data and the control signals outputted from the CPU 210, or the like, into the internal bus 250 to the driving unit 15 as they are or with due modification.

According to the above-described constitution, the CPU 210 performs: the inputting of the various detection signals, various commands, various data, or the like, according to the control program inside the ROM 220; the processing of the various data or the like, inside the ROM 220 and the RAM 230; and outputting of the control signals to the driving unit 15 through the P-CON 240. In this manner, the CPU 210 performs an overall control over the tape printing apparatus 1 by performing the display control of the display screen 41 and by controlling the printing head 7 to thereby print on the tape T under the predetermined printing conditions.

The tape printing apparatus 1 performs most of the processing in interrupt processing. Therefore, when the printing image formation has been prepared, the user may depress the printing key at an arbitrary timing. Then, an interrupt processing occurs and the printing processing is started up, whereby the printing of the printing image can be made based on the printing image data. In other words, the operating procedure to the printing can be arbitrarily selected by the user.

Figure 3A:
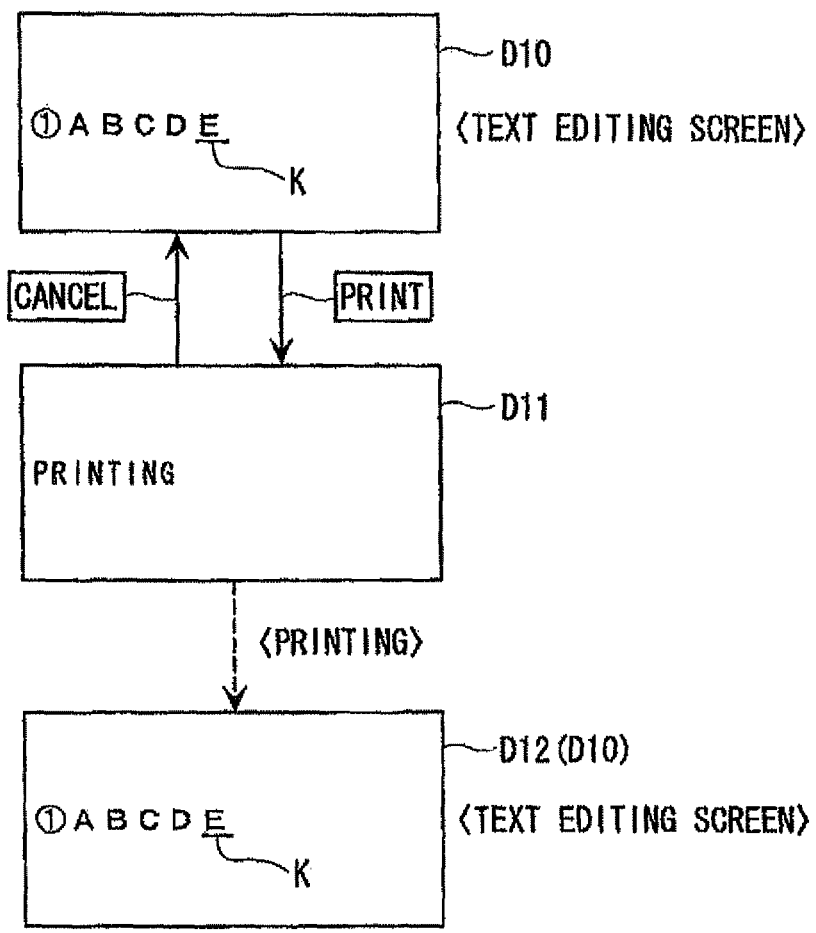
FIGS. 3A-3B are explanation views showing one example of display screen at the time of printing, typical operations on the display screen, and result of printing.
Figure 3B:
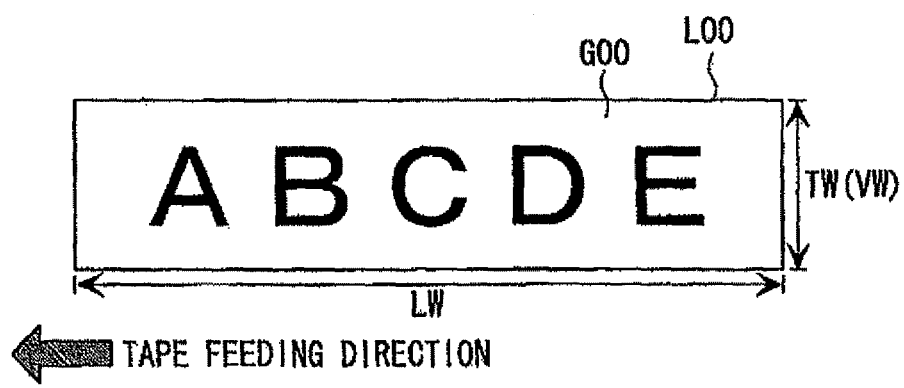

As shown in FIG. 3A, when the printing key is depressed in a state of text editing screen display after inputting the first line letters (character array) "ABCDE" up to the cursor K (screen D10: hereinafter, the state of display screen 41 is referred to only as "Dxx" like "D10," "D11," "D12"), a message of "Printing" is displayed (D11), and the character array "ABCDE" is printed as a printing image G00. Depending on the setting, the tape is cut to thereby form or obtain a label L00 of a tape width (label width) of TW and a printing length (label length at the time of forming the label=label width in the longitudinal direction of the tape) of LW (see FIG. 3B. When the printing is finished, the procedure return to the original text editing screen (D12: same as D10). In the tape printing apparatus 1 the user can delete the various instructions through key inputting by means of a delete key. For example, by depressing the delete key in the above-described state (D11), the screen can be returned to the state in which the original text editing screen is displayed (D10).

When a form key among the function keys is depressed by the user in the above-described state (D10), a selection screen for selecting various forms is displayed. If "with external frame" is selected out of alternatives (or options) in that state by operating the selection key, various candidates for "external frame" are displayed as options. From that state the user can select "external frame." When the printing key is depressed in a state in which, after having made the above-described selection, the screen has returned to the text editing screen (D10 in FIG. 3A), the message of "printing" is displayed (D11). Also, printing is made of the externally framed character array of "ABCDE" as in FIG. 4C as the printing image G10, thereby forming the label L10. Once the printing has been finished, the screen returns to the original text editing screen (D12: same as D10).

Figure 4A:
FIGS. 4A-4C are explanation views showing one example of parenthesized image, printed image, and label, respectively.
Figure 4B:
Figure 4C:
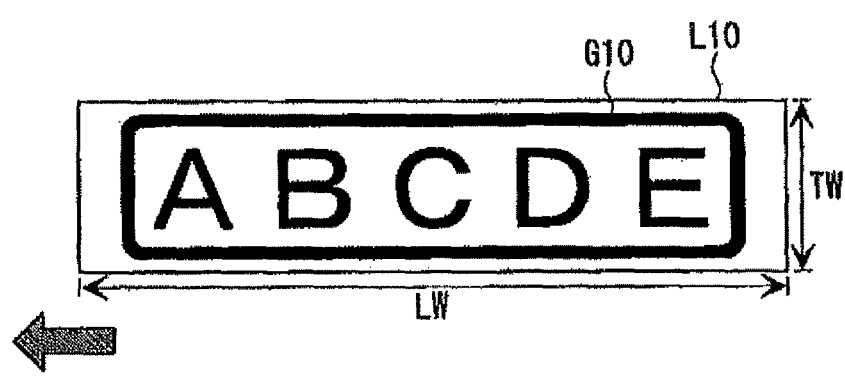

In this case, as an internal processing, as shown in FIG. 4A, a front parenthesized image ([ ) F10 and a rear parenthesized image (] ) R10 each having a designated type of external frame are disposed and connected together by ruled lines. In this manner, the designated (selected) external frame is formed, followed by printing processing.

In such a processing, if the parenthesized image F10, or the like, is prepared by bit map font for each of the sizes (size: height, width, or the like), a vast amount of memory capacity is required. As a solution, there is often used outline font which can be easily enlarged or reduced to relatively free sizes. However, even if the outline font is used, separate setting for respective sizes cannot be made. In this specification, "image F10, or the like," for example, is intended to mean not only F10, but also R10. Hereinafter, such an alternative expression "or the like" is not always repeated each time in order to prevent the sentences from getting complicated; instead, where applicable, it is to be understood that such an alternative (R10 in this particular example) is implied even if it is not specifically listed up.

It will be easily made to set the height of the parenthesized image F10 which forms the width of the external frame to n [dot] as shown in FIG. 5D. Even in such a case, in order to take the line width to m [dot], there will be required outline font data showing the ratio of height:line width=n:m (or line width/height=m/n). If they have to be prepared for various kinds, there can be attained little or no saving in memory capacity despite the use of outline font.

In the tape printing apparatus 1 of this invention, a parenthesized image can be made, in such a case, easily and in a good-looking manner based on outline font.

A description will now be made in detail about an example. Suppose that a parenthesized image F10 (or R10: F10 is used as en example here) which constitutes one of the front and rear pair of the above-described front parenthesized image F10 and the rear parenthesized image R10 is formed or made based on outline font by designated height of n [dot] and designated line width of m [dot]. First, as shown in FIG. 5B, there is prepared by image development an image M10 which has a height (the size of the parenthesis as measured in the opening width thereof) of n [dot] and in which the entire circumference is painted black or solidly shaded in black (effective pixels of logic "1"). This image M10 is referred to as a first-size solidly shaded image.

As the data (original outline data) for the basic (or starting) outline font, there are prepared, as shown in FIG. 5A, at least the following, namely, data B10-3 which shows only the outline of the outside shape of the parenthesis (outside shape of the parenthesis is hereinafter also referred to as "parenthesized outside shape"), and data B10-2 which shows a single closed line consisting of the parenthesized outside shape and a line connecting both open ends thereof and, still furthermore, original outline data B10 which is wholly painted black (effective pixels) within the outside shape. They are stored, e.g., in the control data area 222 of the ROM 220. Based on the above, the image development of height n [dot] is made.

It is to be noted here that the original outside shape data B10 is outline font data and, therefore, even if the height n [dot] is freely set, the curved portions can be formed smoothly in a good-looking manner. In case only the outline of the outside shape is drawn, on the other hand (for example, in case the parenthesized image F10 in FIG. 5D is formed by image development based on the outline font), the line width m [dot] is determined based on the ratio of enlargement at the time of determining the height n [dot] and, therefore, cannot be arbitrarily designated. However, in the image M10 in FIG. 5B, the inside is wholly painted black and the line width thus does not matter.

Then, as shown in FIG. 5C, in a similar manner, there is formed an image in a second size (second-size solidly shaded image) S10 which is smaller along the parenthesized outside shape than the image M10 by the designated line width m [dot]. Namely the height of the image S10 is equal to (n−2m) [dot]. In this case, too, since the image S10 is based on the original outside shape data B10 (outline font), the curved portions can also be formed in a good-looking manner. Further, since the inside is solidly shaded, the line width of the outline offers no problem.

Thereafter, the image M10 and image S10 are displaced by the line width m [dot] along the parenthesized outside shape and perform non-equivalence operation between the corresponding pixels. Then, as shown in FIG. 5D, there will remain only the portion which corresponds to the difference in size between both the images (i.e., dotted portion as shown in FIG. 5C). In other words, only the amount equivalent to the designated line width m [dot] remains along the parenthesized outside shape. It follows that only the parenthesized outside shape portion having the designated height of n [dot] and the designated width of m [dot] remains, thereby forming the desired parenthesized image F10.

According to the above-described method, there can be obtained the parenthesized image F10 having a desired height of n [dot] and a desired line width of m [dot] by designating the height n [dot] and the line width m [dot] easily and in a good-looking manner even in case curved portions such as arcs are partly included.

Further, in the above-described case, the original outside shape data B10 is the data which is to be, solidly shaded (or wholly painted) not only in the original outside shape (outline) but also inside the outside shape (effective pixels). Therefore, when the image (first-size solidly shaded image) M10 or the image (second-size solidly shaded image) S10 is formed, it is not necessary to prepare in advance (or to add by insertion) the processing in which the inside of the outside shape (outline) is scanned and, depending on the result, the inside is solidly shaded. An image which is solidly shaded inside can be easily prepared only by performing image development based on the outside shape data B10.

In the above-described example, the user selects the "external frame" and thereafter the procedure returns to the text editing screen. Alternatively, the width of the external frame (or that "height" of the parenthesized image F10 which corresponds thereto) or the line width may be directly inputted in numerical values. In this case, a message to urge the inputting of numeric value or the cursor K showing the inputting position may be displayed on the display screen. Further, as the unit for inputting the numeric values, aside from an ordinary length unit (e.g., inches, centimeters), a dot may also be employed as the unit of inputting, or both may be arranged to be selectable. In addition, depending on the character size of the inputted character array or on the tape width TW of the mounted tape T, the width of the external frame (or the height of the parenthesized image) may be automatically determined (by reference to a table), thereby using it as the above-described designated value.

Figure 6A:
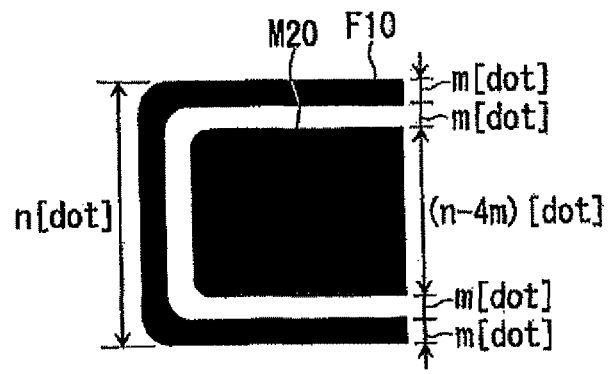
FIGS. 6A-6C are explanation views, similar to those of FIGS. 5A-5D, showing another example.
Figure 6B:
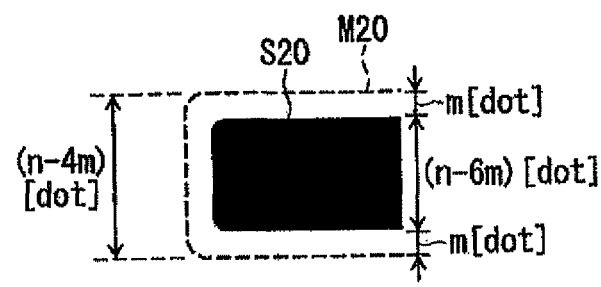
Figure 6C:
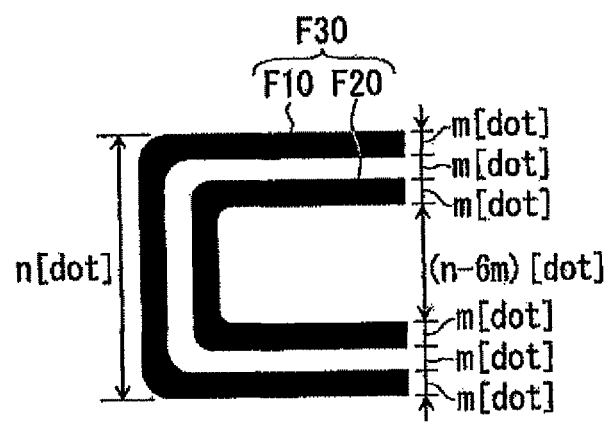

Alternatively, as shown in FIG. 6A, inside the above-described parenthesized image F10 described with reference to FIG. 5C, there may be formed by image development an image M20 which is smaller than the inside (i.e., the size of the image F10) of the image F10 by a line width of m [dot] along the parenthesized outside shape in a height of (n−4m) [dot] (see FIG. 6A). Similarly, an image S20 is formed along the parenthesized outside shape in a size which is smaller than the image M20 by the line width m [dot] and which has a height of (n−6m) [dot]. Then, the image M20 and image S20 are similarly displaced and perform non-equivalence operation between the corresponding pixels. By thus forming a parenthesized image F20 inside, there can be obtained a double-lined parenthesized image F30 for the external frame as a whole. By repeating the similar operations, multiple-lined image having more than three lines can be easily made based on one kind of original outside shape data. Since the outline font is used, the curved portions can be forted smoothly and in a good-looking manner.

Aside from the above-described parenthesized images of 〔-shape as shown in FIGS. 5A-5C and 6A-6C, other types of parenthesized images such as F50 of 〔-shape as shown in FIGS. 7A-7D may also be formed. The image M50 (first-size solidly shaded outside shape) or the image S50 (second-size solidly shaded outside shape) are formed by image development based on the original outside shape data B50 of outline font. They are then subjected to a non-equivalence operation to thereby obtain the image F50 with smooth curves and in a good-looking manner.

Figure 8A:
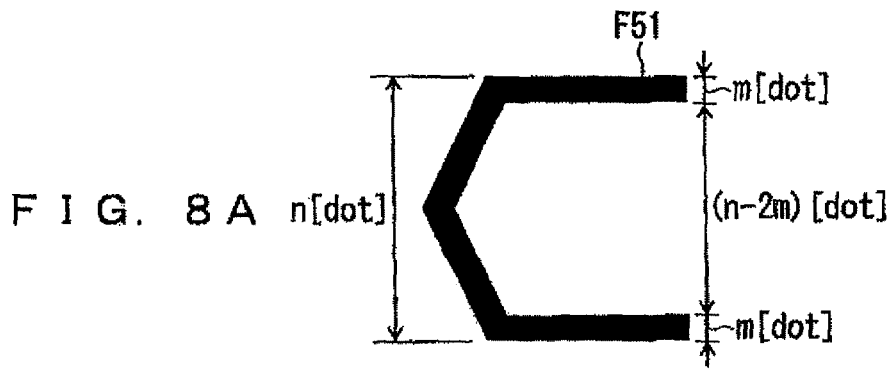
FIGS. 8A-8C are explanation views showing various examples of parenthesized images that can be similarly formed.
Figure 8B:
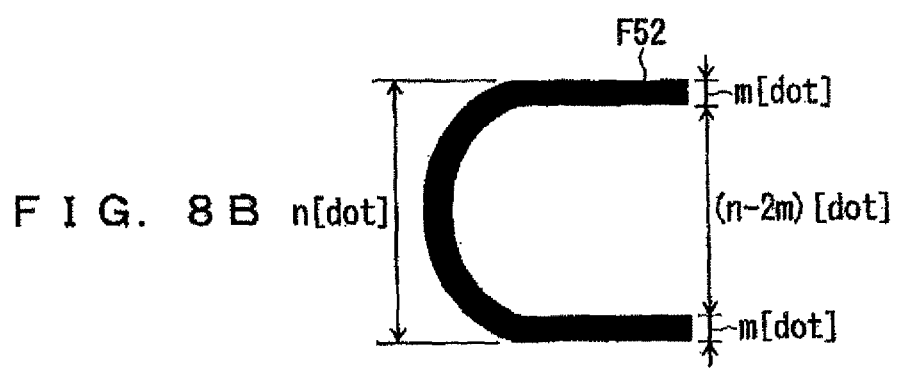
Figure 8C:
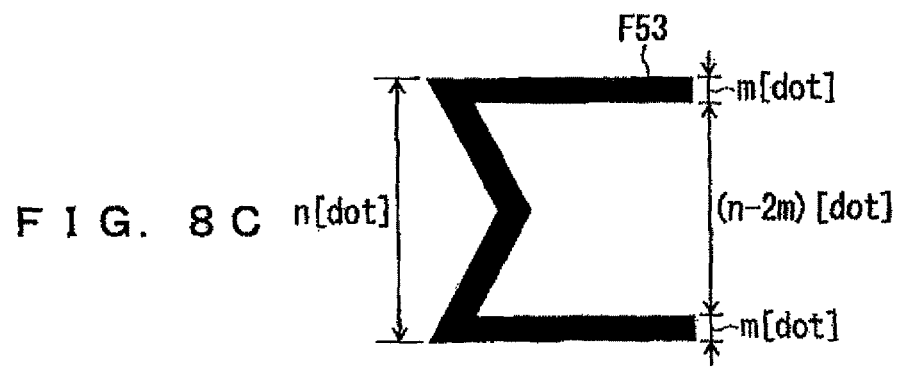
Figure 9A:
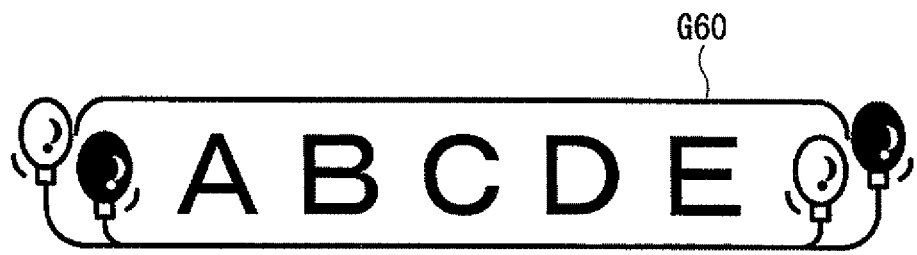
FIGS. 9A-9C are explanation views showing various examples of printed images including externally framed images for decoration purpose.
Figure 9B:
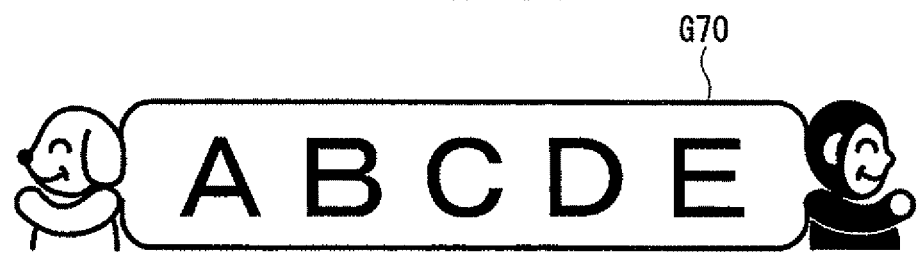
Figure 9C:
Figure 10A:
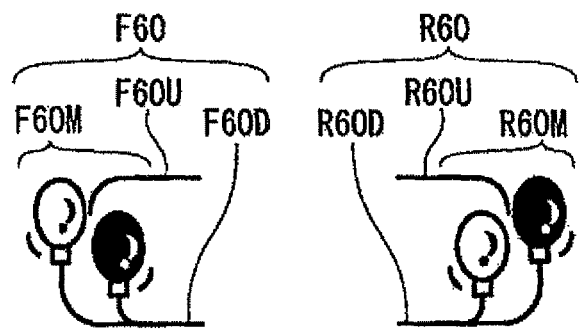
FIGS. 10A-10C are explanation views showing front and rear images to be used in FIGS. 9A-9C.
Figure 10B:
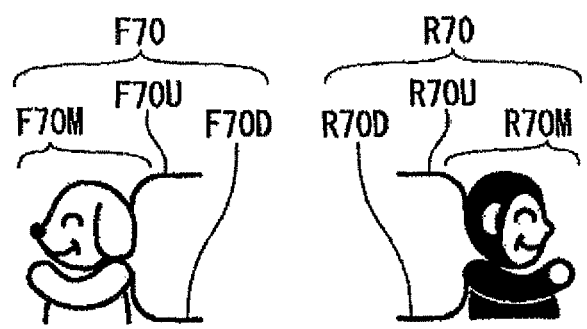
Figure 10C:
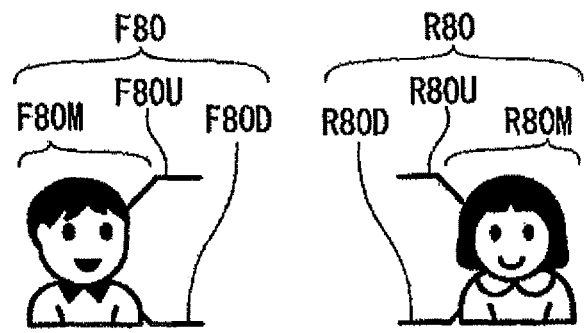

In addition, regarding various kinds of parenthesized images F51-F53 as shown in FIGS. 8A-8C, they can be similarly formed. In concrete, the first-size and second-size solidly shaded images are formed by image development based on the original outside shape data of outline font and are then subjected to a non-equivalence operation. An image can thus be obtained with smooth curves and in a good-looking manner.

In the above-described first embodiment, examples were described in which a pair of front and rear parenthesized images of external frames are connected by ruled lines to thereby form externally framed images. Therefore, the front parenthesized image and the rear parenthesized image are both relatively simple parenthesized images. Aside from the above-described examples, the externally framed images include those for decoration purposes with more complicated decorative images of e.g., good-looking fancy pictures (or figures).

As shown in FIGS. 9A-9C and 10A-10C, this kind of externally framed images are formed similarly in the following manner. Any one of designated type of front decorative-figure images F60-F80 and corresponding one of rear decorative-figure images R60-R80 are disposed respectively and are connected together by ruled lines. As a result, externally framed image G60-G80 is formed as a whole, which is subsequently subjected to printing processing.

In this case, each of the decorative-figure images F60-F80, R60-R80 (hereinafter typically referred to as "F70") is made up of: upper withdrawing (or extension) lines F60U-F80U, R60U-R80U (hereinafter typically referred to as "F70U") which are to be connected to the upper ruled lines; and lower extension lines F60D-F80D, R60D-R80D (hereinafter typically referred to as "R70D") which are to be connected to lower ruled lines, aside from the decorative-figure image F60M-F80M, R60M-R80M (hereinafter typically referred to as "F70M").

Therefore, the size n [dot] of each of the decorative-figure images F70 is determined by the distance (size) between the upper edge of the upper extension line F70U and the lower edge of the lower extension line F70D (e.g., n [dot] in FIG. 11A-11B; hereinafter referred to as "height").

Similarly as in the case of the parenthesized images, the externally framed images may also be formed in the following manner. Namely, the width of the "external frame" (or the height of the corresponding decorative-figure image F70) or its line width is directly designated in a numerical value so that the externally framed image can be formed easily and in a good-looking manner. Alternatively, an arrangement may also be made so that inputting can be made not only by an ordinary length unit but also by the unit of dots. Or else, they may be made to be arbitrarily selectable. Alternatively, based on the character (or letter) size of the character string image, or the tape width TW of the mounted tape, the height and the line width may be automatically determined by reference to a table, thereby using it as the designated value.

In case the externally framed image is formed of each of the above-described decorative-figure images for decorative purposes (hereinafter also referred to as "decorative image"), it is preferable to use outline font which is capable of enlarging and reducing to a relatively free size and which can be enlarged and reduced smoothly. It is, however, still difficult, as in the case of the various parenthesized images in the above-described first embodiment, to make the decorative-figure image to an arbitrary height and make the extension line to an arbitrary line width.

In addition, due to rounding error, or the like, in terms of calculation depending on the ratio of enlargement, the line width of the upper extension line F70U which serves as the connecting point to the ruled line and the line width of the lower extension line F70D will vary by the unit of dots (differs by one dot depending on the rounding error), resulting in an unbalanced shape. Further, the line width of the extension line after enlarging does not coincide with the line width of the predetermined ruled line. The above will result in a problem in that the connecting point becomes stepped and that the outline is not smooth.

As a solution, in the tape printing apparatus 1, an arrangement is made such that the connecting point between the extension lines of the front and rear decorative-figure images becomes smooth and that an externally framed image of an arbitrary height and arbitrary line width can be formed in a good-looking manner. A description thereabout will now be made as a second embodiment.

In the tape printing apparatus 1 of this embodiment, the externally framed image is formed by connecting the upper extension line and the lower extension line of the front decorative-figure image and the upper extension line and the lower extension line of the rear decorative-figure image by means of an upper ruled line and a lower ruled line. In order to secure smoothness at the connecting point, the outline of the externally framed image near the connecting point is adjusted.

For example, as shown in FIG. 11A, in case the front ends (connecting points) of the upper extension line F70U and the lower extension line F70D of the front decorative-figure image F70 having a designated height of n [dot] in an externally framed image before adjustment is smaller in line width than the upper ruled line LU70 or the lower ruled line LD70 having a designated line width of m [dot], the image including the connecting point to be adjusted, within the externally framed image before adjustment, is made to be the image adjustment region.

In the illustrated example, the image adjustment region is defined to be the one enclosed or covered by the point at which the upper extension line F70U or the lower extension line F70D becomes a line width, in the height direction, of m [dot] and a minute length dt to the front end, i.e., dt [dot] wide×m [dot] high. Here, an outline adjustment image (a logic sum image) E70T as shown in FIG. 11B is prepared (i.e., is formed by image development based on outline font and is stored). This image is disposed in the connection and the logic sum operation is performed, thereby smoothing the outline (see FIG. 11C).

In other words, in the above-described example in FIGS. 11A-11C, the logic sum image E70T is used as the outline adjustment image.

In the above-described example, the point at which the height is equal to the line width m [dot] coincides with both the upper extension line F70U and the lower extension line F70D. In an example, in which the point in question does not coincide, there may be provided separate image adjustment regions (one for the upper part or upper side and the other for the lower part or lower side). Further, in case the line width in the height direction of one of the extension lines does not attain m [dot], or in case a rectangular logic sum image E70T disposed in the point in question gives rise to a disagreement (or is not natural), there may be used a logic sum image E70T-2, E70T-3 of an inclined (a trapezoidal) shape, or a curved one may be used instead of the inclined one.

The logic sum image E70T, or the like, has a ruled-line-part side (i.e., a "side" which lies on the part of the ruled line) which coincides with the ruled-line width m [dot] and an extension-line-part side which coincides with the extension-line width mt. This image is a so-called filled-in image in which both these ends are connected together, thereby forming a single closed loop which serves as an outline, and the inside enclosed by the outline is solidly shaded or solidly filled) with black (effective pixels of logic "1"). As described above, the processing in which the ruled-line-part side is made to coincide with the ruled-line width and the extension-line-part side is made to coincide with the extension-line width, and in which the externally parenthesized image is subjected to logic sum operation result in that the logic sum image is overlapped with (or added to) the externally parenthesized image. It follows that the ruled line and the extension line are smoothly connected together in a good-looking manner to covet the connecting point which is an object of adjustment.

Next, a description will be made with reference to FIG. 12A. In an externally framed image before adjustment, if the front end of the upper extension line F70U or the lower extension line F70D of the front decorative-figure image having a designated height of n [dot] is larger (i.e., having a larger line width) than the designated line width in [dot], an image adjustment region is similarly set. In this case, the image adjustment region is defined as the one which is covered by width of [dot]×height n [dot], where df is a minute length between the front end of the upper extension line F70U or the lower extension line F70D and a position in which the outline (curved line) does not become unnatural even if the extension line is scraped or cut off).

There is now prepared, by image development based on outline font data and stared, an outline adjustment image (logical product image) E70F which is a so-called blank image formed by painting the inside thereof, inclusive of the outline, with white (invalid pixels of logic "0") over the entire size of df [dot] wide×(n−2m) [dot] long. It is then disposed in the connecting point and is subjected to logical product operation, thereby smoothly adjusting the outline (see FIG. 12C).

In other words, in the example shown in FIGS. 12A-12C, logical product image E70F is used as the outline adjustment image. Like in the above-described examples, the image adjustment region may be provided separately in the upper side and in the lower side, respectively, as explained with reference to FIGS. 11A-11C. In case the outline of any of the extension lines is unnatural, there may be provided an inclination on the upper side or the lower side or is made into curves.

The logical product image E70F in these cases is suitable to the case in which only the outer-edge side (outside of the outline) is made to coincide (or is made flush) with each other. In other words, that upper edge of the upper extension line F70U which serves as the outer edge of the externally framed image and the upper edge of the upper ruled line LU70 are connected together to make them coincide with each other. Also, that lower edge of the lower extension line F70D which serves as the outer edge of the externally framed image and the lower edge of the lower ruled line LD70 are connected together to make them coincide with each other. Then, since the outer edges become smooth as shown, it is only the inner edges the connecting points of which become conspicuous. As an outline adjustment image suitable for the above, there is provided the logical product image E70F.

The logical product image E70F in this case is made up of a ruled-line-part side which coincides with the distance, i.e., (n−2m) [dot], between those inner edges of the upper ruled line LU70 and of the lower ruled line LD70 which form the inside of the external frame; and an extension-line-part side which coincides with the distance between the inner edges of the upper extension line F70U and of the lower extension line F70D. It is a blank image whose inside inclusive of the outline is filled with white (invalid pixels) all over, where the outline is defined to be a single closed loop which is formed by connecting together the ruled-line-part side and the extension-line-part side.

In other words, the ruled-line-part side is made to coincide with the inner edge of the ruled line, and the extension-line-part side is made to coincide with the inner edge of the extension line. When the externally framed image is then subjected to a logic product operation, that portion of the externally framed image which overlaps with the logic product image will be deleted. As a result, if there is prepared a logic product image having a smooth outline as the logic product image E70F, it is possible to scrape or cut off the outline of the externally framed image along the outline to thereby smoothly connect the outlines of the ruled line and the extension line. The externally framed image can thus be adjusted in a good-looking manner.

Figure 13A:
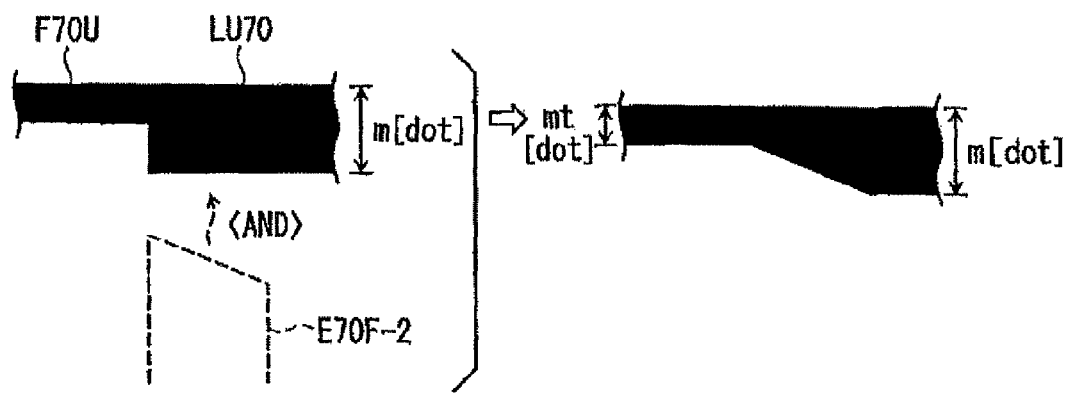
FIGS. 13A-13B are explanation views showing another example of outline adjustment images.
Figure 13B:
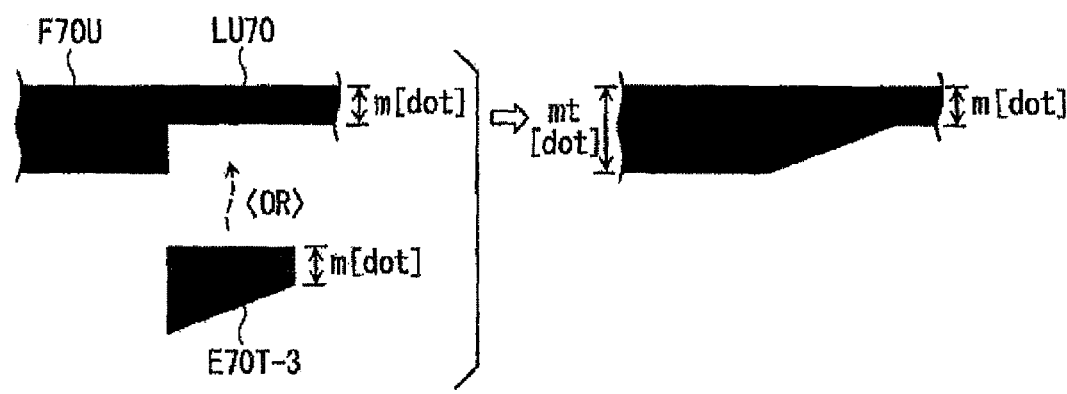

In the above examples shown in FIGS. 11A-11C and 12A-12C, the image adjusting region is assumed to be on the extension-line side of the decorative-figure image F70. The following arrangement may also be made. Namely, as shown in FIG. 13A relative to FIG. 11A, and as shown in FIG. 13B relative to FIG. 12A, the image adjustment region is assumed on the ruled-line side. Then, in the example shown in FIG. 11A, a logic product operation is performed on the ruled line (upper ruled line LU70 in the illustrated example) with the logic product image E70F-2 having an inclination as shown in FIG. 13A. The step on the inner-edge side is scraped or cut off to thereby obtain a smooth outline. In the example shown in FIG. 12A, a logic product operation is performed by overlapping the logic product image E70T-3 having an inclination as shown in FIG. 13B with the ruled line (upper ruled line LU70 in the illustrated example). There can thus be added an inclination to thereby obtain a smooth outline. As a result, the outlines of the ruled line and the extension line can be smoothly connected together, thereby adjusting the externally framed image in a good-looking manner.

Figure 14A:
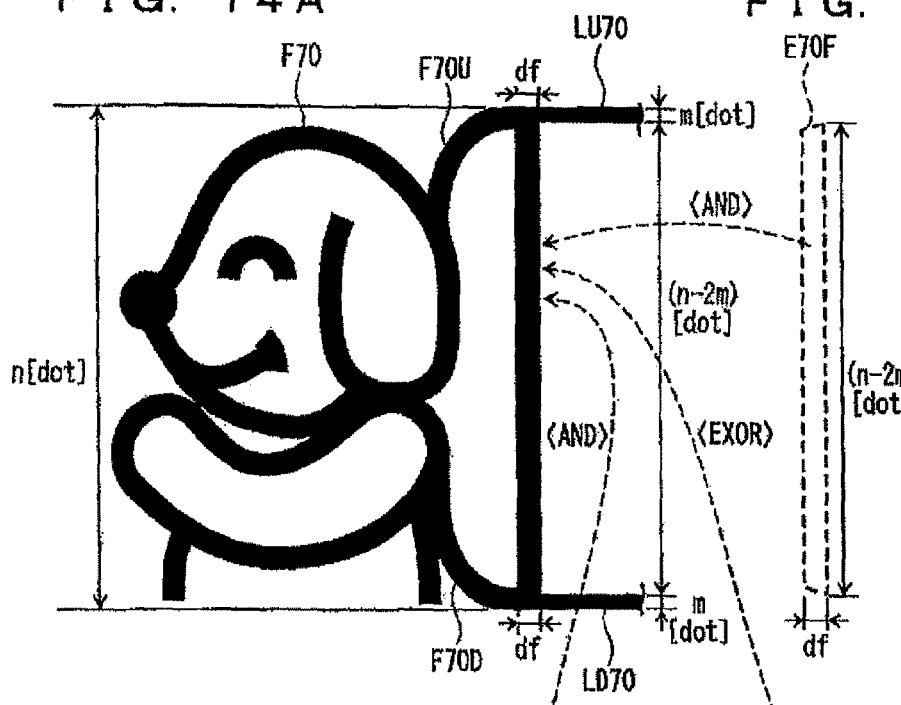
FIGS. 14A-14D are explanation views, similar to those in FIGS. 11A-11C, showing still another example.
Figure 14B:
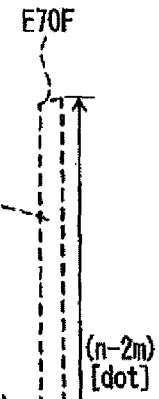
Figures 14C, 14D:
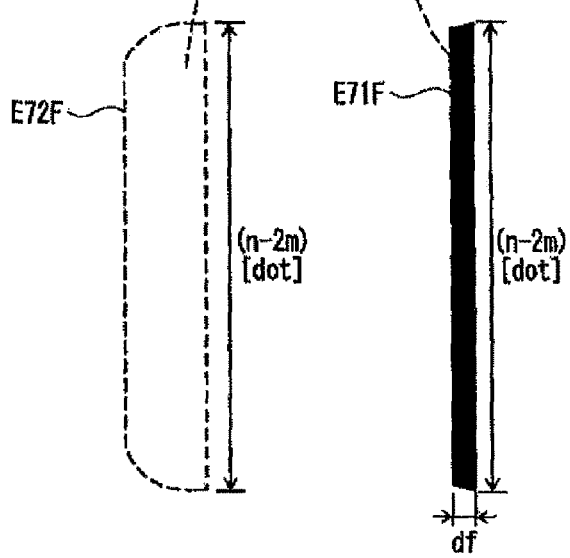

In addition, the inside of the image adjustment, region may be solidly shaded from the state as shown in FIG. 12A. Then, instead of preparing the logic product image E70F as described hereinabove (FIG. 14B) to thereby perform a logic product operation, there can be used the non-equivalence image E71F as the outline adjustment image, as shown in FIG. 14C, which is of the same size and is black inside thereof. A non-equivalence operation may be performed with the image in question. Furthermore, instead of the above-described logic product image E70F, there may be used a logic product image E72F which has a curved outline to facilitate further smoothing.

The above described method referred to in FIGS. 14A-14D may still further be advanced. Namely, in case the upper extension line F70U and the lower extension line F70D are connected together at the base thereof, the upper extension line F70U and the lower extension line F70D have direct connecting points. As shown in FIGS. 15A-15D, there is obtained an outline which is formed by: a first ruled-line-part side having a length of n [dot] which is formed by connecting a point on an upper edge of the upper ruled line LU70 (a point on the upper side at the connecting point in the illustrated example) and a point on a lower edge of the lower ruled line LD70 (a point on the lower side at the connecting point in the illustrated example); and a first outline as a single closed line which is formed by the upper extension line and the lower extension line up to the connecting point. The inside of the outside shape is solidly shaded in black (effective pixels), thereby making it as an image adjustment region.

In this manner, as shown in FIG. 15A, there will be no problem in line width of the upper extension line F70U or the lower extension line F70D of the decorative-figure image after enlargement. In this case, as the outline adjustment image, there can be prepared a blank logical product image E74F which has a second ruled-line-part side of a size smaller on both ends than the above-described first ruled-line-part side, respectively, by the line width (predetermined width) m [dot]. The remaining portion of the image E74F is formed of a single closed curve as a second outline which is smaller by the line width m [dot] than the outside shape along the first outline, and the entire image E74F inclusive of the second outline is filled in white. As the outline adjustment image, there can be prepared a non-equivalence image E75F which is filled in black (effective pixels) within the outside shape along the second outline.

In these cases, the second ruled-line-part side of a length (n−2m) [dot] is made to coincide with the first ruled-line-part side (in the center in this case). The remaining portion is made to deviate by the line width m [dot] along the first outline. Then, logical product operation is performed between the corresponding pixels in case of the logical product image E74F, and non-equivalence operation is performed between the corresponding pixels in case of the non-equivalence image E75F. As a result, there will remain only the size difference between the size of the image adjustment region and the size of the outline adjustment image (logical product image E74F or non-equivalence image E75F).

Namely, in these cases, the method of forming is the same as the one as described in the first embodiment (see FIGS. 5A-5D through FIGS. 5A-8C). As shown in FIG. 15D, only the amount equivalent to the line width (predetermined line width) m [dot] along the first outline and is connected to the upper ruled line LU70 or the lower ruled line LD70 of the line size m [dot]. Therefore, the outline of the ruled line and the extension line can be smoothly connected together in a good-looking manner.

Further, in the above case, if the shape (curve) of the outline of the outline adjustment image is adequately modified, the line width of the above-described upper extension line F75U or the lower extension line F75D need not be unified. Instead, only the front end is made to have a line width m [dot] so that it can remain as the extension line similar to the upper extension line F70U or the lower extension line F75D of the original decorative-figure image F70.

Figures 16A, 16B:
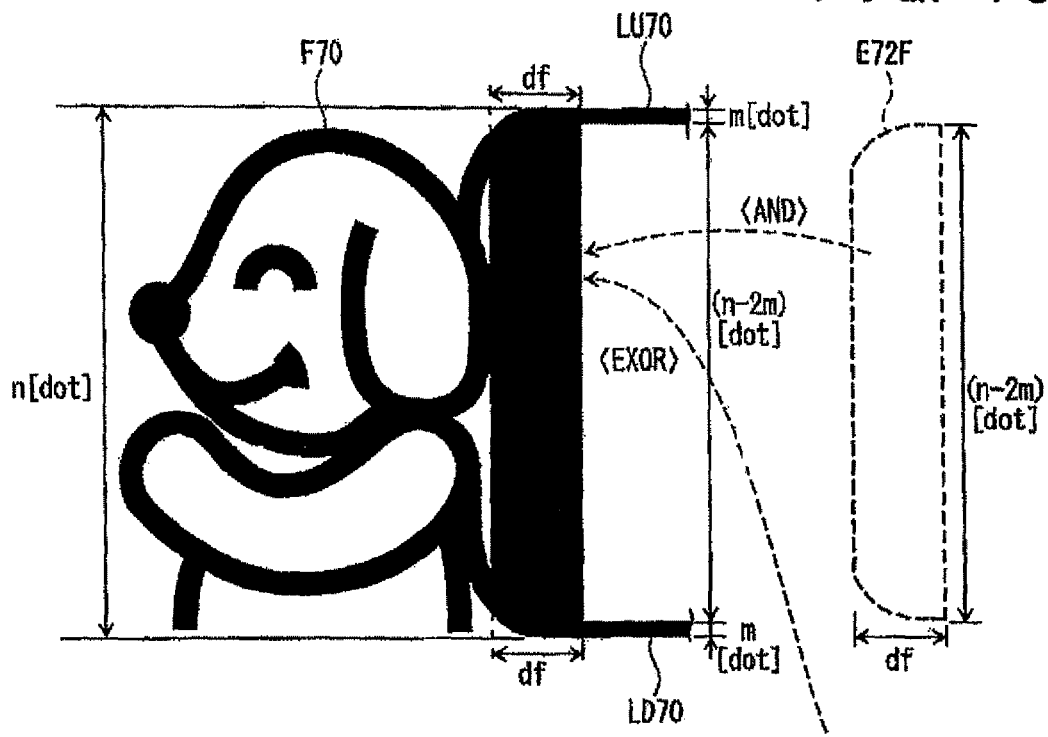
FIGS. 16A-16D are explanation views, similar to those in FIGS. 11A-11C, showing still another example.
Figures 16C, 16D:
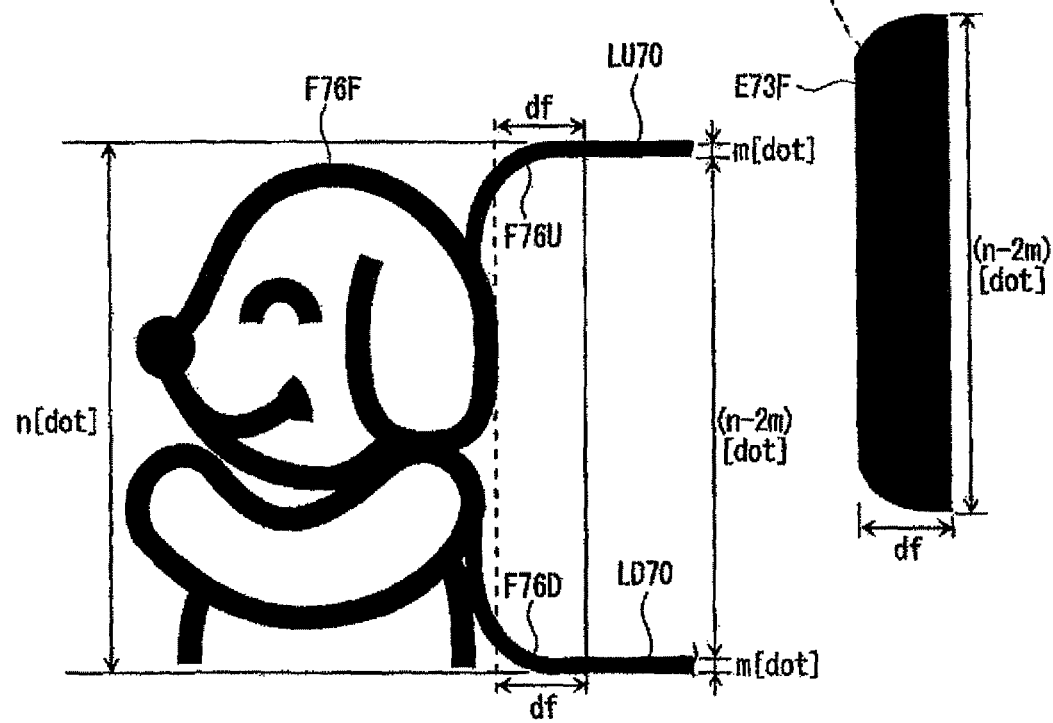

In addition, the above-described method can be further simplified as shown in FIG. 16A. Namely, the shape of the image adjustment region is made simpler. A region which is completely capable of adjustment by logical product operation with the above-described logical product image E70F (adjustable like in FIG. 12C) is assumed, and the inside of the outside shape may be entirely filled in black (effective pixels), thereby making an image adjustment region. In this case, instead of the logical product operation with the logical product image E70F, non-equivalence operation can also be performed with the non-equivalence image E73F, whereby a similar result (see FIG. 16D, same as in FIG. 12C) can be obtained.

In order to further simplify the procedure, as shown in FIGS. 17A-17D, the following method may also be employed. Namely, the image adjustment region is supposed to be in the same state as in FIG. 15A (see FIG. 17A). Ignoring the fact that black partly remains (see image F76 in FIG. 16D), logical product operation with the above-described logical product image E70F or non-equivalence operation with the non-equivalence image E73F can be performed.

As explained hereinabove, according to the tape printing apparatus 1 of this invention, once the externally framed image is formed. With this image in question serving as an externally framed image before adjustment, at least one of the connecting points between the extension lines of the front and rear decorative-figure images and the ruled lines is made to be a connecting point for adjustment. In a state in which the line width of at least the central portion of the ruled line is maintained, outline adjustment to smooth the outline of the connecting point which is the object of adjustment is performed. The outline of this connecting point can thus be made smooth. In other words, when the front and rear decorative-figure images are disposed, they may be disposed at an arbitrary height irrespective of the line width. When the ruled lines are disposed, the smoothness at the connecting points may be disregarded to some extent and dispose them in a manner, e.g., only the outer-edge side (outside of the external frame) is made to coincide with or made to be flush with) each other. The externally framed image is thus once formed and, thereafter, the smoothness at the connecting point can be adjusted. As a result, the externally framed image of an arbitrary height and arbitrary line width can be formed in a good-looking manner.

In particular, among the externally framed image, the image region inclusive of the connecting point to be adjusted is made to be the image adjustment region. That outline adjustment image for outline adjustment which can be disposed in the image adjustment region is stored, and logic operation corresponding to the pixels utilizing the outline adjustment image is performed on the externally framed image before adjustment in the image adjustment region. Therefore, shapes of the connecting points to be adjusted, i.e., various kinds of shapes that can occur as a mode which does not accompany smoothness are assumed, and images of shapes that can adjust them are prepared (stored) as the outline adjustment images. Then, by performing adequate logical operation using them, the outline which is the object for adjustment can be smoothly adjusted.

Figures 18A, 18B:
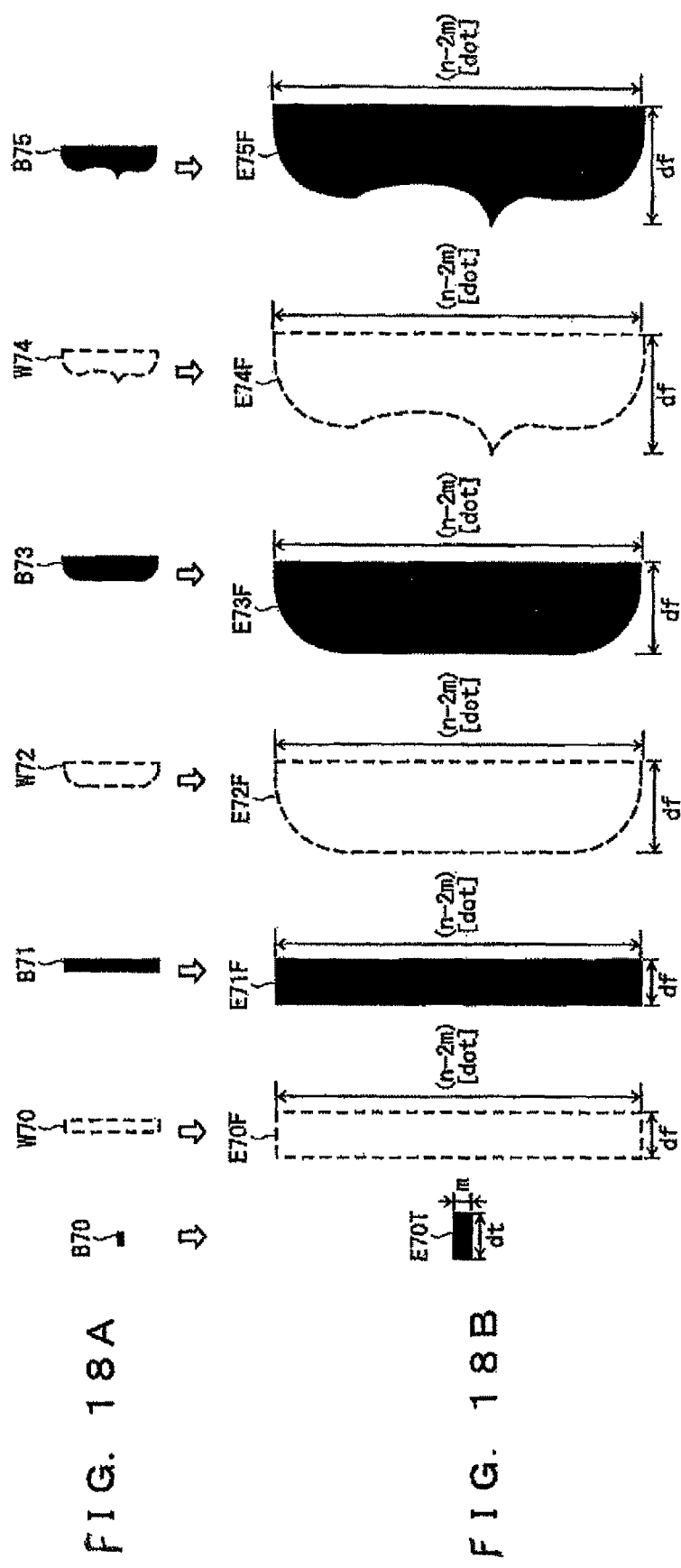
FIGS. 18A-18B are explanation views showing various examples of outline adjustment images and their original data.

The front or rear decorative-figure image (F70, or the like) shall preferably be prepared in the form of outline font data in the following manner. Namely, as shown in FIGS. 18A-18B, each of the above-described outline adjustment images E70T, E70F-E75F is also prepared as B70, W70, B71, W72, B73, W74, B75, where the one having effective pixels in black inside has numbering preceded by "B" and the one having invalid pixels in white inside has numbering preceded by "W." In this arrangement, the outline adjustment image can be used to advantage by enlarging to suit the enlargement ratio of the front or rear decorative-figure image.

Further, the apparatus for preparing a parenthesized image and the apparatus for preparing externally framed image as well as various methods thereby (method of forming parenthesized image and method of forming externally framed image) employed in the above-described first and second embodiments of the tape printing apparatus 1 of this invention are applicable not only to the tape printing apparatus 1 but also to a program which is to be processed by various programmable apparatuses. In addition, they are also applicable to memory media such as CD, MD, DVD, or the like, for storing therein that kind of program. By storing such a program therein or reading it therefrom to put into running, the parenthesized image of arbitrary height and arbitrary line width can be easily formed based or outline font in a good-looking manner. Or else, the connecting point between the extension lines of the front and rear decorative-figure images and the ruled lines can be smoothed to thereby form the externally framed image of an arbitrary height and arbitrary line width in a good-looking manner.

It is further understood by those skilled in the art that the foregoing is the preferred embodiment of the invention, and that various changes and modifications may be made without departing from the spirit and scope thereof.

What is claimed is:

1. An apparatus for forming an externally framed image in which the externally framed image is formed by connecting, with an upper ruled line and a lower ruled line, an upper extension line and a lower extension line of a front decorative-figure image constituting a front end portion of an external frame to an upper extension line and a lower extension line of a rear decorative-figure image constituting a rear end portion of the external frame, respectively, said apparatus comprising a CPU configured to:

dispose the front decorative-figure image, the rear decorative-figure image, the upper ruled line and the lower ruled line so that one outside contour of the upper ruled line coincides with an outside contour of the upper extension line of the front decorative-figure image and the other outside contour of the upper ruled line coincides with an outside contour of the upper extension line of the rear decorative-figure image, and one outside contour of the lower ruled line coincides with an outside contour of the lower extension line of the front decorative-figure image and the other outside contour of the lower ruled line coincides with an outside contour of the lower extension line of the rear decorative-figure image, set an image adjustment region inclusive of at least one of a connecting point between the upper extension line of the front decorative-figure image and the upper ruled line, a connecting point between the lower extension line of the front decorative-figure image and the lower ruled line, a connecting point between the upper extension line of the rear decorative-figure image and the upper ruled line, and a connecting point between the lower extension line of the rear decorative-figure image and the lower ruled line, and adjust an inside contour of the extension line or the ruled line in the image adjustment region so that the inside contour of the extension line coincides with the inside contour of the ruled line at the connecting point.

2. The apparatus according to claim 1, wherein the CPU further stores a contour adjusting image for adjusting the contour, the contour adjusting image being disposable in the image adjustment region and adjusts the inside contour by performing a logic operation, using the contour adjusting image, with corresponding pixels relative to the externally framed image.

3. The apparatus according to claim 1, wherein the CPU sets the image adjustment region inclusive of the connecting point and a part of the ruled line.

4. The apparatus according to claim 1, wherein the CPU sets the image adjustment region inclusive of the connecting point and a part of the extension line.

5. A method of forming an externally framed image executed by a CPU in which the externally framed image is formed by connecting, with an upper ruled line and a lower ruled line, an upper extension line and a lower extension line of a front decorative-figure image constituting a front end portion of an external frame to an upper extension line and a lower extension line of a rear decorative-figure image constituting a rear end portion of the external frame, respectively, the CPU executing steps of:

disposing the front decorative-figure image, the rear decorative-figure image, the upper ruled line and the lower ruled line so that one outside contour of the upper ruled line coincides with an outside contour of the upper extension line of the front decorative-figure image and the other outside contour of the upper ruled line coincides with an outside contour of the upper extension line of the rear decorative-figure image, and one outside contour of the lower ruled line coincides with an outside contour of the lower extension line of the front decorative-figure image and the other outside contour of the lower ruled line coincides with an outside contour of the lower extension line of the rear decorative-figure image, setting an image adjustment region inclusive of at least one of a connecting point between the upper extension line of the front decorative-figure image and the upper ruled line, a connecting point between the lower extension line of the front decorative-figure image and the lower ruled line, a connecting point between the upper extension line of the rear decorative-figure image and the upper ruled line, and a connecting point between the lower extension line of the rear decorative-figure image and the lower ruled line, and adjusting an inside contour of the extension line or the ruled line in the image adjustment region so that the inside contour of the extension line coincides with the inside contour of the ruled line at the connecting point.

6. A non-transitory computer-readable medium storing a program thereon capable of performing the method of forming the externally framed image according to claim 5.

7. A tape printing apparatus comprising the apparatus according to claim 1 and configured to print the externally framed image formed by the apparatus on a tape.

* * * * *